(12) United States Patent
Crane et al.

(10) Patent No.: US 8,608,415 B2
(45) Date of Patent: Dec. 17, 2013

(54) INTERMODAL TRANSPORT PLATFORM

(71) Applicant: Raildecks (2009), Inc., Calgary (CA)

(72) Inventors: Murray Crane, Calgary (CA); Simon Hann, Alberta (CA); Ben Van Liere, Coalhurst (CA)

(73) Assignee: Raildecks (2009), Inc., Calgary, Alberta (CA)

( * ) Notice: Subject to any disclaimer, the term of this patent is extended or adjusted under 35 U.S.C. 154(b) by 0 days.

(21) Appl. No.: 13/690,519

(22) Filed: Nov. 30, 2012

(65) Prior Publication Data

US 2013/0089387 A1    Apr. 11, 2013

Related U.S. Application Data

(63) Continuation of application No. 13/035,897, filed on Feb. 25, 2011, now Pat. No. 8,342,784.

(60) Provisional application No. 61/387,905, filed on Sep. 29, 2010, provisional application No. 61/433,198, filed on Jan. 14, 2011, provisional application No. 61/440,803, filed on Feb. 8, 2011.

(51) Int. Cl.
*B65D 88/12*     (2006.01)
*B60P 1/64*     (2006.01)

(52) U.S. Cl.
USPC .......................................................... 410/46

(58) Field of Classification Search
USPC ............ 410/46, 77, 31, 34–35, 43, 56–57, 66, 410/71, 76, 78, 104, 2, 100; 414/227; 220/1.5, 6–8, 23.4, 23.6
See application file for complete search history.

(56) References Cited

U.S. PATENT DOCUMENTS 2,170,185 A    8/1939  Scott
3,073,466 A    1/1963  Greer
(Continued)

FOREIGN PATENT DOCUMENTS

CA    2689737    4/2010
CA    2681296    3/2011
(Continued)

OTHER PUBLICATIONS

PCT Search Report and Written Opinion for PCT/CA2010/000076, mailed Jun. 16, 2010.

(Continued)

*Primary Examiner* — Glenn Dayoan
*Assistant Examiner* — Sunsurraye Westbrook
(74) *Attorney, Agent, or Firm* — Neal, Gerber & Eisenberg LLP

(57) ABSTRACT

A collapsible intermodal transport platform and methods for its operation are disclosed. The invention comprises first braces that rotate about a mounting point on the frame that supports a cargo loading surface. The first braces are positioned along the platform so as to provide lifting and stacking fitments at the standard overhead crane lifting points when in a lift configuration. The first braces may be rotated inboard down to the loading surface, thereby presenting stacking blocks at the crane lifting points for stacking several platforms together. Second braces attach to the first braces to assist in load distribution. The second braces may assist in translating the platform from one position to another by rotating along a wheel. Other features and aspects disclosed lend to the invention's low weight and high carrying capacity, as well as its unique load securing features.

12 Claims, 31 Drawing Sheets

(56) References Cited

U.S. PATENT DOCUMENTS

| | | | |
|---|---|---|---|
| 3,085,707 A | 4/1963 | Tatlinger | |
| 3,195,506 A | 7/1965 | Beard | |
| 3,480,174 A * | 11/1969 | Sherwood | 220/1.5 |
| 3,591,033 A | 7/1971 | Partridge | |
| 3,612,569 A | 10/1971 | Marinelli | |
| 3,735,713 A | 5/1973 | Glassmeyer | |
| 3,995,760 A | 12/1976 | Burgdorf | |
| 4,068,813 A * | 1/1978 | Chatwin et al. | 410/7 |
| 4,099,640 A | 7/1978 | Nessfield | |
| 4,162,737 A | 7/1979 | Clive-Smith | |
| 4,353,520 A | 10/1982 | Jansson | |
| 4,586,646 A | 5/1986 | Booher | |
| 4,591,307 A | 5/1986 | Clive-Smith | |
| 4,646,928 A | 3/1987 | Ono | |
| 4,650,381 A | 3/1987 | Durkin | |
| 4,848,618 A | 7/1989 | Yuan | |
| 5,257,896 A | 11/1993 | Hastings | |
| 5,275,301 A | 1/1994 | Clive-Smith | |
| 5,494,182 A * | 2/1996 | Clive-Smith | 220/6 |
| 5,509,559 A | 4/1996 | Okano | |
| 5,639,174 A | 6/1997 | Gonska | |
| 5,644,992 A | 7/1997 | Clive-Smith | |
| 5,810,186 A | 9/1998 | Lam | |
| 5,941,405 A | 8/1999 | Scales | |
| 6,123,208 A * | 9/2000 | Haenszel | 211/175 |
| 6,227,397 B1 | 5/2001 | Kim | |
| 6,317,981 B1 | 11/2001 | Clive-Smith | |
| 6,513,442 B1 | 2/2003 | Miller et al. | |
| 6,655,300 B1 | 12/2003 | Clive-Smith | |
| 6,739,468 B1 | 5/2004 | Colebrook | |
| 6,866,160 B2 | 3/2005 | Wang et al. | |
| 7,011,223 B1 | 3/2006 | Grigsby, Sr. | |
| 7,011,479 B2 | 3/2006 | Sain | |
| 7,568,754 B2 | 8/2009 | Adams | |
| 7,571,953 B2 | 8/2009 | Adams | |
| 7,739,965 B2 | 6/2010 | Heinrichs | |
| 7,802,526 B2 | 9/2010 | Brady | |
| 7,823,739 B2 | 11/2010 | Sadkin | |
| 7,896,427 B2 | 3/2011 | Adams | |
| 8,057,143 B2 | 11/2011 | Adams | |
| 8,262,328 B2 | 9/2012 | Crane | |
| 8,342,784 B2 | 1/2013 | Crane et al. | |
| 8,353,647 B2 | 1/2013 | Crane et al. | |
| 2002/0009345 A1 | 1/2002 | Clive-Smith | |
| 2005/0000834 A1 | 1/2005 | Clive-Smith | |
| 2005/0081762 A1 | 4/2005 | Clive-Smith | |
| 2005/0180833 A1 | 8/2005 | Almind | |
| 2006/0022426 A1 | 2/2006 | Clive-Smith | |
| 2006/0104755 A1 | 5/2006 | Clive-Smith | |
| 2007/0206999 A1 | 9/2007 | Clive-Smith | |
| 2009/0273203 A1 | 11/2009 | Adams | |
| 2011/0073595 A1 | 3/2011 | Crane | |
| 2012/0076607 A1 | 3/2012 | Crane et al. | |

FOREIGN PATENT DOCUMENTS

| | | |
|---|---|---|
| CA | 2682416 | 4/2011 |
| CN | 1240753 | 1/2000 |
| EP | 0893366 A2 | 1/1999 |
| GB | 2097364 A | 11/1982 |
| GB | 2376014 | 12/2002 |
| WO | 2006/005920 A1 | 1/2006 |
| WO | 2007071942 | 6/2007 |
| WO | 2009106521 | 9/2009 |
| WO | 2011038480 | 4/2011 |

OTHER PUBLICATIONS

PCT Search Report and Written Opinion for PCT/IB/002915, mailed Jun. 5, 2012.

Non-Final Office Action of U.S. Appl. No. 13/035,899, mailed Jul. 6, 2012.

Non-Final Office Action of U.S. Appl. No. 13/035,897, mailed Jul. 6, 2012.

Notice of Allowance of U.S. Appl. No. 13/044,406, mailed Jul. 26, 2012.

Notice of Allowance for U.S. Appl. No. 13/035,899, mailed Nov. 16, 2012.

Notice of Allowance for U.S. Appl. No. 13/035,897, mailed Nov. 21, 2012.

Non-Final Office Action of U.S. Appl. No. 13/044,406, mailed Jun. 28, 2012.

Freight containers—Coding, identification and marking; International Standard; ISO 6346; Third Edition, Dec. 1, 1995; 1995(E).

ISO 6346 Container Codes: Datasheet [online]. ISO 6346 Container Codes, Check Digit, Calculator, Size & Type, 2012 [retrieved on Aug. 15, 2012]. Retrieved from the internet: <URL: http:/www.shippingcontainers24.com/general/iso-6346-codes/#axzz23dHvOwlO.

45 Foot Shipping Container: Datasheet [online]. 45 foot Shipping Container Dimensions—45 Feet, Internal Sizes, Homes, 2012 [retrieved on Aug. 15, 2012]. Retrieved from the internet: <URL: http:/www.shippingcontainers24.com/dimensions/45-foot#axzz23dHvOwlO.

Clive-Smith Associates Ltd, Domino Collapsible Flatrack, 48 ft Domino Type (13) lightweight intermodal, Part #SB47138, Ref 48(13) Mar. 1 SB, 1 page.

* cited by examiner

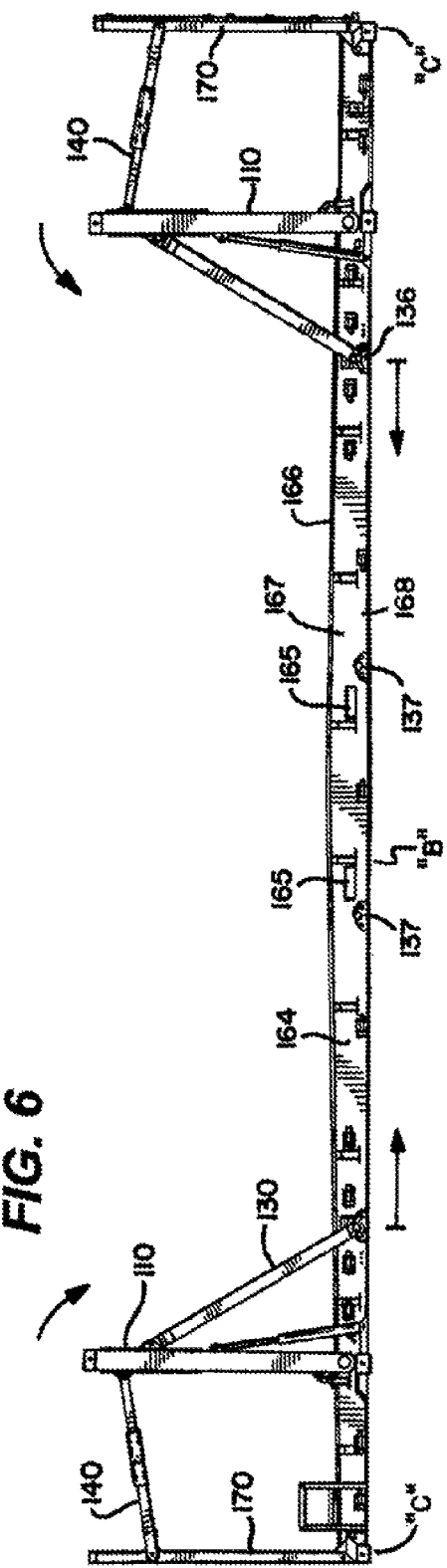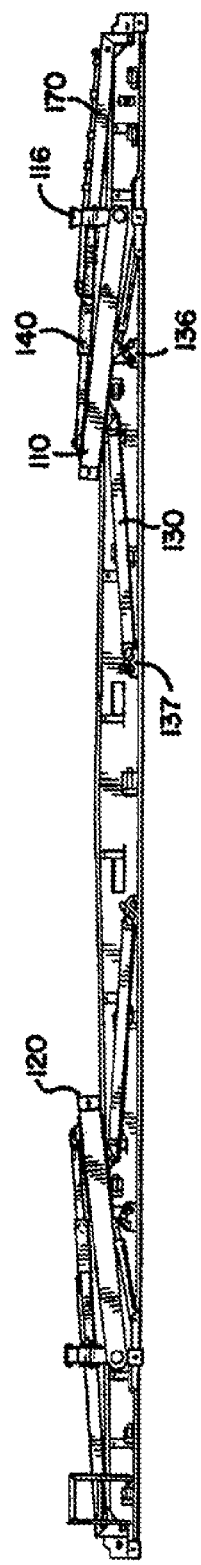

INTERMODAL TRANSPORT PLATFORM

CROSS-REFERENCE TO RELATED APPLICATION

This application is a continuation of U.S. patent application Ser. No. 13/035,897 filed Feb. 25, 2011, which, in turn, claims priority to U.S. Provisional Patent App. No. 61/387,905 filed on Sep. 29, 2010, U.S. Provisional Patent App. No. 61/433,198 filed on Jan. 14, 2011, and U.S. Patent App. No. 61/440,803 filed on Feb. 8, 2011. Each of these applications are incorporated herein by reference in their entirety.

TECHNICAL FIELD

The present invention relates to equipment for transporting cargo, and methods for operating such equipment. More specifically, the invention is directed at equipment for transporting cargo using multiple modes, such as railroad, truck or ship, in a single trip without requiring the cargo to be moved from one transport device to another.

BACKGROUND OF THE INVENTION

Bulk cargo may be transported over long distances using various modes, such as ship, truck or railcar. Typically, the cargo is transported in rectangular, box-like containers that may be permanently connected to a wheeled chassis (such as in the case of a truck trailer or railcar), or may be independent containers that can be temporarily fixed to and transported on a railcar or truck chassis. The independent containers, referred to as intermodal containers, allow for a single load to be transported by multiple modes, e.g., truck and rail, without moving the cargo from one container to another. These containers are also used to transport cargo by ship, where several containers are often stacked on atop the other.

Over time, standards have developed to help ensure that intermodal containers are compatible with the various modes of shipment. For instance, the length and width of intermodal containers must comport with the railcar or trailer chassis on which they will be hauled, attachment points must be properly positioned for mating, and the container height must allow for passage under overpasses or through tunnels while in transit. In addition, it is desirable that intermodal containers be of standard exterior dimensions so as to conserve space and provide load stability when positioning and stacking the containers on ship decks or in storage yards. The standard intermodal container is shaped like a rectangular box having a length of forty feet (~12 meters), a width of eight feet, and providing structural lift and stack points at each of its eight corners. These points, referred to herein as the Forty Foot Points, correspond to a standard position used by overhead cranes throughout the shipping industry to move cargo containers. Though intermodal containers may be longer than forty feet (some European containers are now 45 feet (~14 meters) long, while many North American containers are 53 feet (~16 meters) long), the longer containers still provide structural fitments for lifting and stacking at the Forty Foot Points.

Intermodal standardization has lead to efficiencies in the logistics industry. For example, certain high-speed rail lines are dedicated to transporting dual-stacked intermodal containers because of the amount of cargo they can contain in a stacked configuration. While it may take cargo in a rail boxcar two weeks to travel from Chicago to the West Coast of the United States, the same cargo loaded on intermodal cars may be there in a two days.

However, the inevitable need to relocate empty intermodal containers is not efficient, because the containers take up as much space empty as they do full. Even when empty, each container usually requires its own trailer chassis for highway transport, because just two standard containers stacked together would be too high for truck transport. At most, rail well cars can only move two standard intermodal containers at once, regardless of whether they are full or empty. Thus, it costs nearly as much to haul an empty container as a full one, but without the revenue from the transport of cargo to offset the cost. Even if container relocation is unnecessary, the empty containers still present a disadvantage in that they take up just as much space when stored in a yard as do full containers. In addition, conventional intermodal containers must be loaded and unloaded one pallet at a time by a forklift that enters and exits through one end of the container. Not only is this a slow process that presents spatial constraints to the forklift operator, it does not allow for the loading of lengthy materials such as pre-formed steel beams, lumber, or other materials not suitable for palletizing.

Flatbed trailers and railcars solve some of these problems because a flatbed can be efficiently loaded from any direction, and can accommodate loading of items as lengthy as the flatbed itself. Flatbeds can also be efficiently stacked when not in use. However, flatbeds are not used for intermodal transport because they cannot be stacked when loaded, and do not provide the requisite structural fitments at the Forty Foot Points for lifting by an overhead crane. Rather, traditional flatbeds are permanently affixed to a trailer or railcar chassis, requiring that cargo transported by flatbed be moved from one flatbed to another in order to continue transport via another mode.

A solution to this problem is to enhance the traditional flatbed design by providing it with structural members at the appropriate lift positions, but allowing those members to collapse or be removed when the flatbed is to be stored or relocated. Though such designs have been attempted, they have not been adopted due to issues with safety, durability and functionality. The collapsible designs that have emerged have been manually operated by removing and hammering in pins, have involved manual installation of structural members, and/or have allowed gravity to slam heavy components together. Though springs and counterweights have been used to assist with manual manipulation, the high level of operator involvement lends to safety hazards and is very time consuming. Moreover, the necessity of structural fitments at the Forty Foot Points conflicts with the desire to enable side and/or top loading of large materials. Thus, there is a desire to move the structural members out of the way to allow for full-length, full-width loading, but then back into place prior to transport. This is preferably done without enabling components to extend laterally beyond the side envelope of the flatbed, as this could cause a safety hazard in transit should a component come unpinned. Prior art collapsible intermodal designs have been functionally limited to forty-five feet of usable deck length and eight feet of usable deck width. Though the fitments must be eight feet apart in width, there is a desire for the deck width to exceed this, such as up to 102".

Finally, prior art attempts at intermodal flatbeds have been limited in the amount of load they can support during lifting operations. By removing the side walls and top of a traditional intermodal container, the tensile load during lifting is fully concentrated at the points along the flatbed where the structural members connect. This point loading can lead to deformation of the flatbed if it is not sufficiently strong. Though the flatbed can be made stronger by adding more steel, this adds weight to the empty load. A heavier empty weight results in less cargo carrying capacity because government weight restrictions on total weight will be reached with less cargo. Despite these issues and challenges experienced in connection with prior art attempts to provide a collapsible intermodal solution, there remains a long felt need for a suitable intermodal transport platform for the logistics industry.

SUMMARY OF THE INVENTION

The present invention provides a fully intermodal collapsible transport platform that overcomes the limitations and shortcomings in the prior art. Two beams having an arcuate upper flange or edge run the length of the platform and provide support for a deck bed which forms the loading surface. The beams are connected by a series of crossmembers running beneath the deck bed, and also by two rotating axle members. The axle members are connected to support members which rotate about the axles. During empty transport, or for storage, the support members are rotated down to the deck bed surface, referred to herein as the stowed position. During loaded transport, overhead lift operations, or stacking/storage of loaded containers, the support members are rotated up so as to place fitments at the Forty Foot Points, referred to herein as the lift or haul position. During loading operations, the supporting members may be rocked outboard so as to provide nearly full-length clearance, referred to herein as the extended load position.

The arcuate beams are adapted to provide superior load properties to minimize deflection and prevent plastic deformation. The beams allow the transport platform to accommodate heavier loads while minimizing overall weight and lending to the relatively flat profile of the transport platform when fully collapsed. Through the use of stacking blocks positioned above the collapsed support members at the Forty Foot Points, the transport platforms may be stacked together or with standard intermodal containers, whether full or empty. The platform is preferably 53 feet in length, and provides fitments at each lower corner for joining to a standard trailer chassis. It also provides fitments at the Forty Foot Points along its base for positioning over the standard hard points of a railroad well car.

In a first illustrated embodiment, the supporting members, or support posts, are manipulated by hydraulic rams which may be electrically powered from a remote source. Longitudinal braces are provided for additional support post rigidity when in the lift or haul position. The support posts are connected to end walls at either end of the deck bed via a slave rod assembly, which spaces the end walls and allows them to raise and lower with the support posts. As the axle rotates, the support posts, the end walls, and the longitudinal braces are lowered down into a stowed position against the surface of the deck bed. Removable lock pins are used to secure the lateral braces to the deck beams in either the lift or stowed positions.

In a second illustrated embodiment, the supporting members, or outboard braces, extend from axles at each end of the platform that pass between the deck beams. The upper flange of each deck beam is removed and the webbing is fixed directly to an extension off of a unitary, welded metal deck bed. Each axle is driven directly by a motor, that may be positioned under and suspended from the deck bed. The lateral braces are replaced by inboard braces having proximal ends which join to the outboard braces at the Forty Foot Points when in the lift or haul position, forming an A-frame structure. Fixed-travel locking pins are used to secure distal ends of the inboard braces in the lift or haul position, or the outboard braces in the stowed position, from fixed points along the deck beams. The deck bed provides an extended-width track over which the lower end of the inboard braces travels during rotation of the axles. Removable end walls may be used and positioned along the deck bed for additional load securement.

Accordingly, the amount of human involvement in the mechanical operation of the collapsible intermodal transport platform is considerably minimized from anything found in the prior art. Controlled actuation under hydraulic or electric power prohibits collapsible members from impacting with one another as the platform is moved from one position to another, thus limiting the risk of operator injury or damage to the components. The motors may be powered by a truck battery or forklift battery, as will typically be present during intermodal loading or unloading operations. In addition, the invention provides superior loading capabilities in a lightweight and efficient design. The result is a transport platform that is safer, quicker to operate, and has a higher haul capacity than those in the prior art.

While certain features and embodiments are referenced above, these and other features and embodiments of the present invention will be, or will become, apparent to one having ordinary skill in the art upon examination of the following figures and detailed description. It is intended that all such additional embodiments and features included within this description, be within the scope of the present invention, and be protected by the accompanying claims.

BRIEF DESCRIPTION OF THE DRAWINGS

The present invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 6 is a side view of the intermodal collapsible transport platform of FIG. 3 in the lift or haul position highlighting certain aspects of the invention.

FIG. 7 is a side view of the intermodal collapsible transport platform of FIG. 3 in the stowed position.

DETAILED DESCRIPTION

Figure 1:
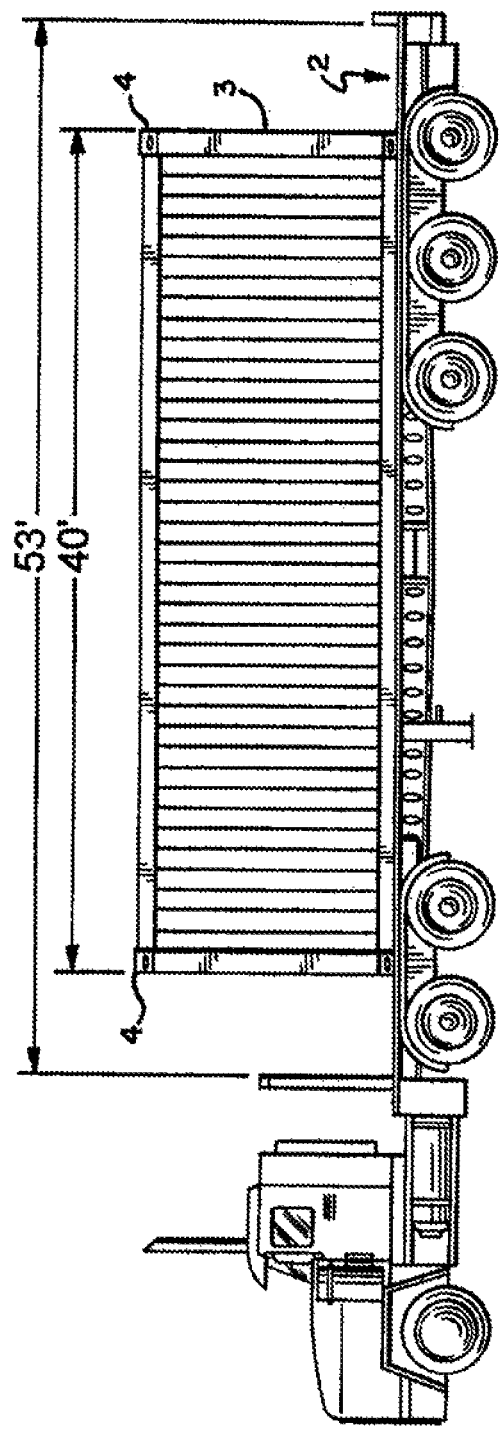
FIG. 1 is a side view of a conventional 40-foot intermodal container loaded on a standard 53-foot truck chassis.

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood to one of ordinary skill in the art.

Figure 24:
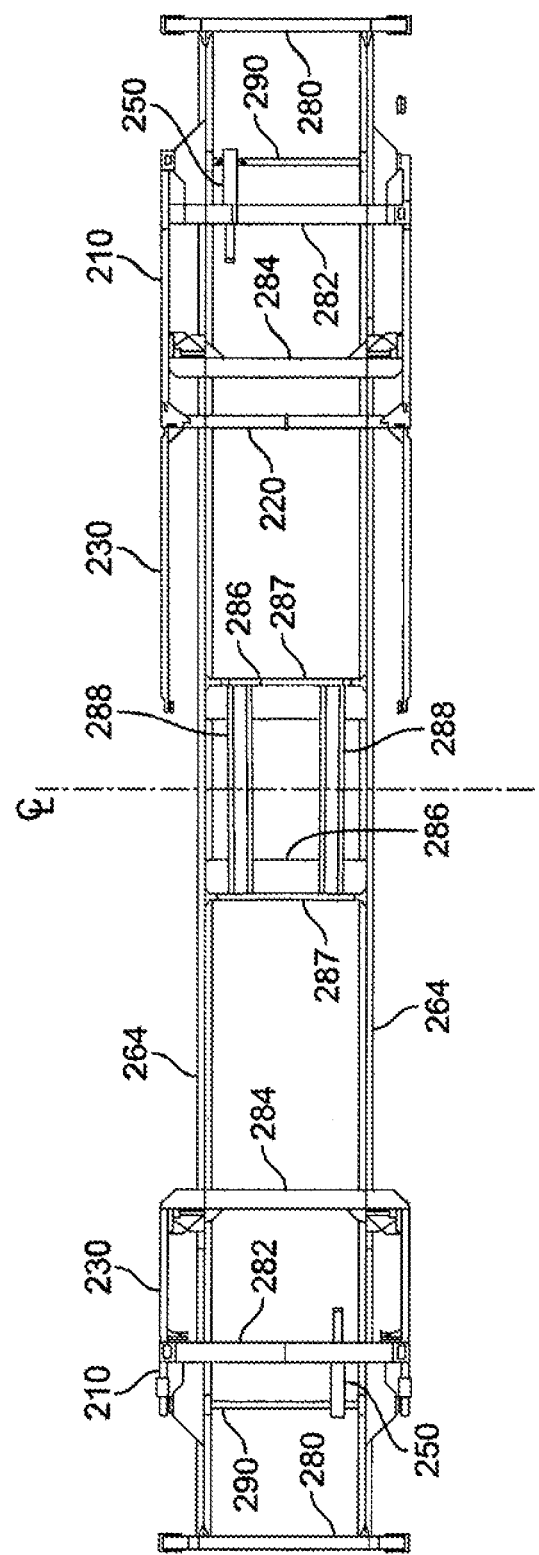
FIG. 24 is a bottom view of the transport platform shown in FIG. 17, with the deck bed removed to highlight certain components.
Figure 27:
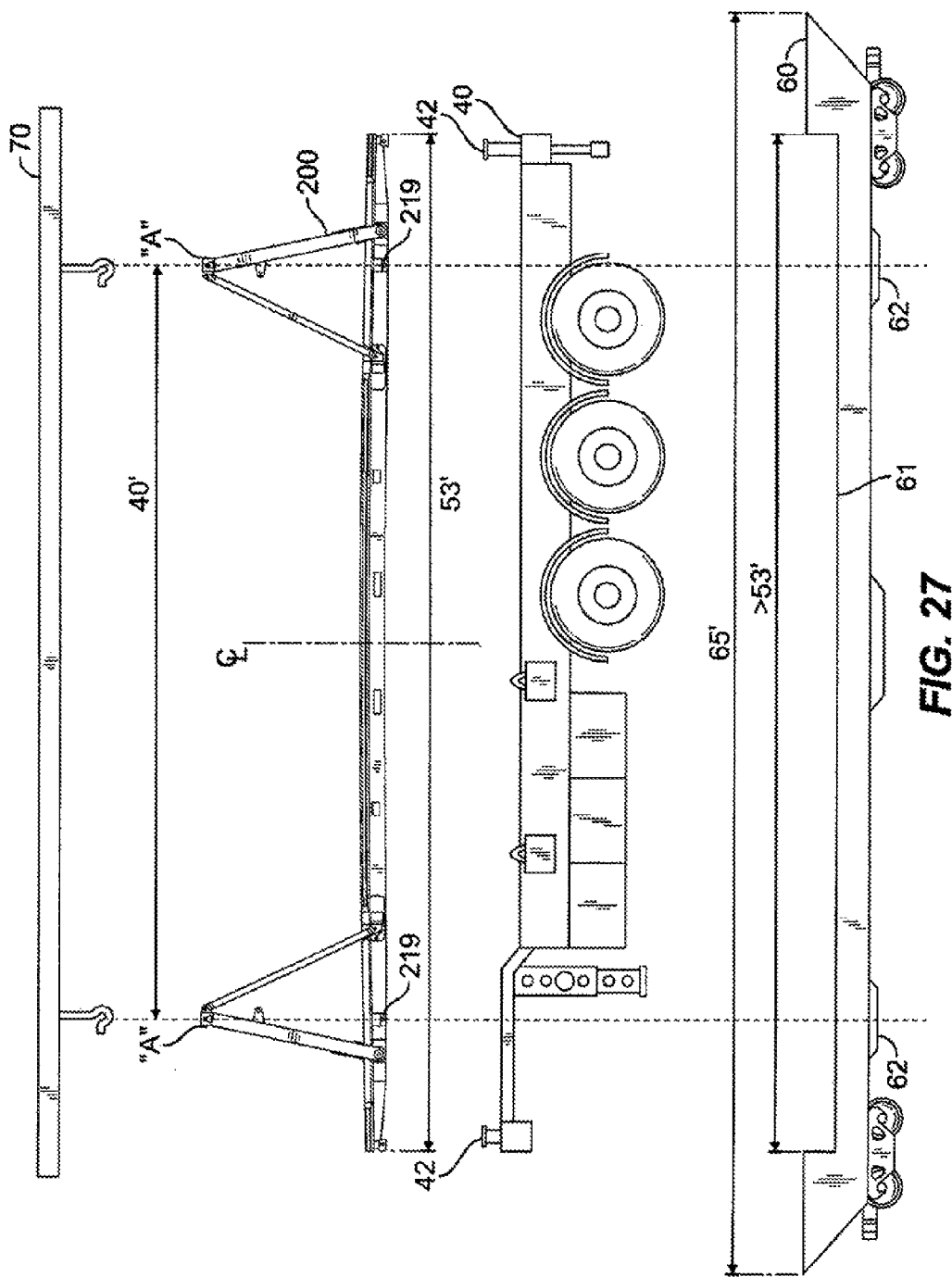
FIG. 27 is an overlay depicting the alignment of stacking and loading points on a transporting device in relation to a standard unloaded over-the-road trailer chassis and a standard railroad well car.

It will be understood throughout this application that the term "longitudinal centerline" will mean an imaginary line marking the midway point through the length of an object. For example, if a rectangle (or a rectangular loading surface) has a length of 40 feet and a width of 10 feet, its longitudinal centerline would be an imaginary line passing through the center of the rectangle, 20 feet from either end. For more clarity, the longitudinal centerline of the transport platform 200 has been superimposed over the transport platform in FIG. 24, showing a bottom view of an exemplary transport platform, and over the transport platform in FIG. 27, showing a front side view of an exemplary transport platform. Distances measured from these longitudinal centerlines would, thus, be perpendicular from them to the left or right.

FIG. 1 shows a standard intermodal container 3 loaded onto a trailer chassis 2. Note that the trailer chassis 2 is longer than the standard intermodal container 3, with the typical trailer lengths being fifty-three feet in North America and forty-eight feet in Europe. However, the intermodal container 3 is only forty feet in length so as to position lift points 4 at the Forty Foot Points for lifting and stacking. Intermodal container 3 is also limited in that it must be end-loaded, and it takes up considerable space even when empty.

Figure 2:
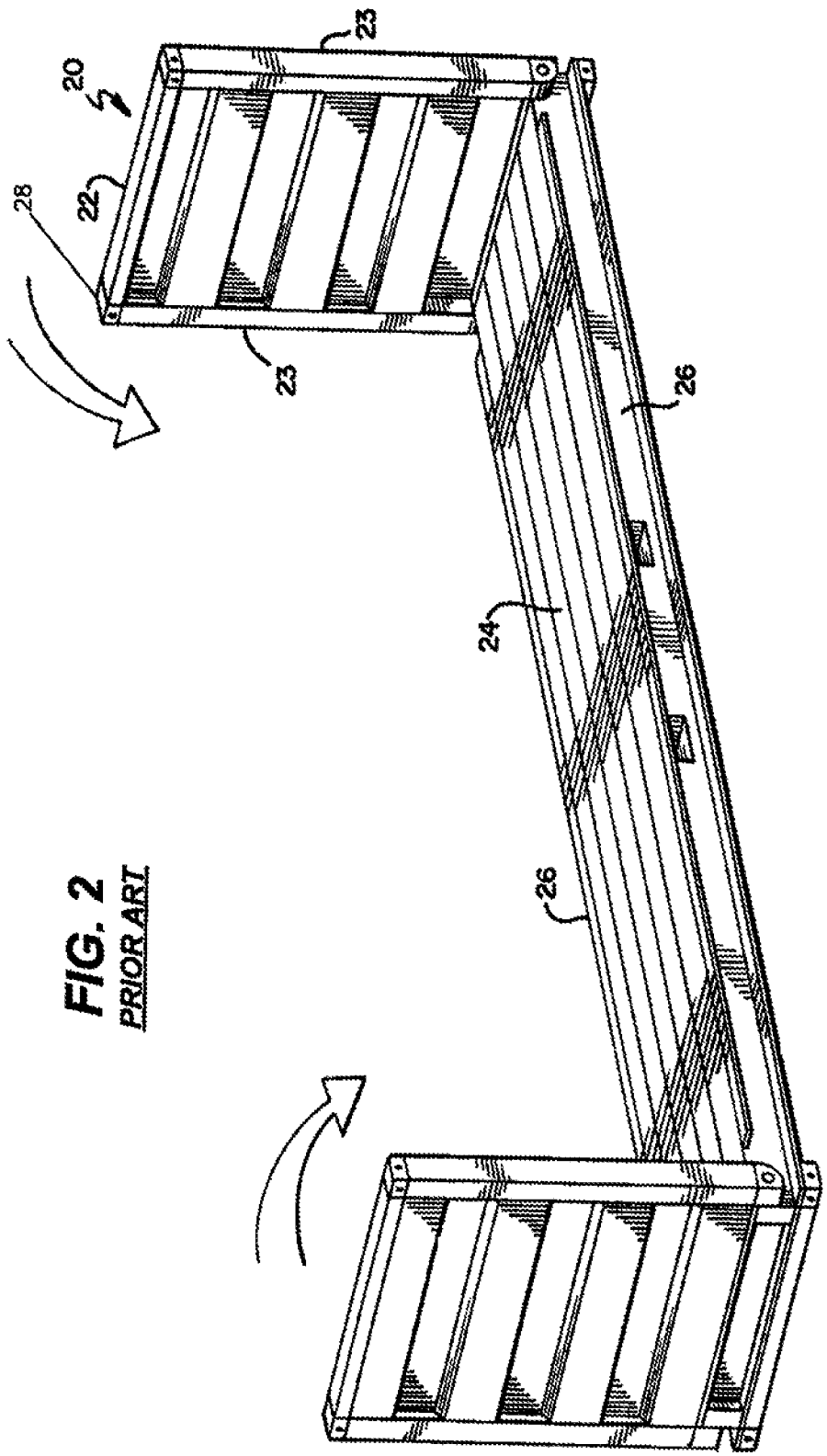
FIG. 2 is a perspective view of a 40-foot flatbed with collapsible end walls.

The platform 20 of FIG. 2 solves some of these problems in that it may be top loaded or side loaded, and has collapsing end walls 22 that may be folded down onto the deck bed 24. The platform 20 has opposing deck beams 26, which are I-beams, each having two flat flanges connected by a vertical web. The deck beams 26 are connected by crossmembers (not shown) over which the decking of deck bed 24 is positioned. At the sides of each end wall 22 is a support post 23 that positions a fitment 28 at the Forty Foot Points to allow for lifting. However, as will be further understood after a description of the present invention's deck beams, this platform 20 could not support a heavy load while being lifted as deformation of the deck beams 26 would result. Moreover, though the end walls 22 rotate about their connection points to the deck beams 26 and collapse to the deck bed 24, converting the platform 20 in this manner is a rough, dangerous job requiring human operators to physically drop the end walls into place and lift them back into haul position. Finally, transport platform 20 presents a major limitation in that it cannot transport loads exceeding forty feet in length.

Figure 15:
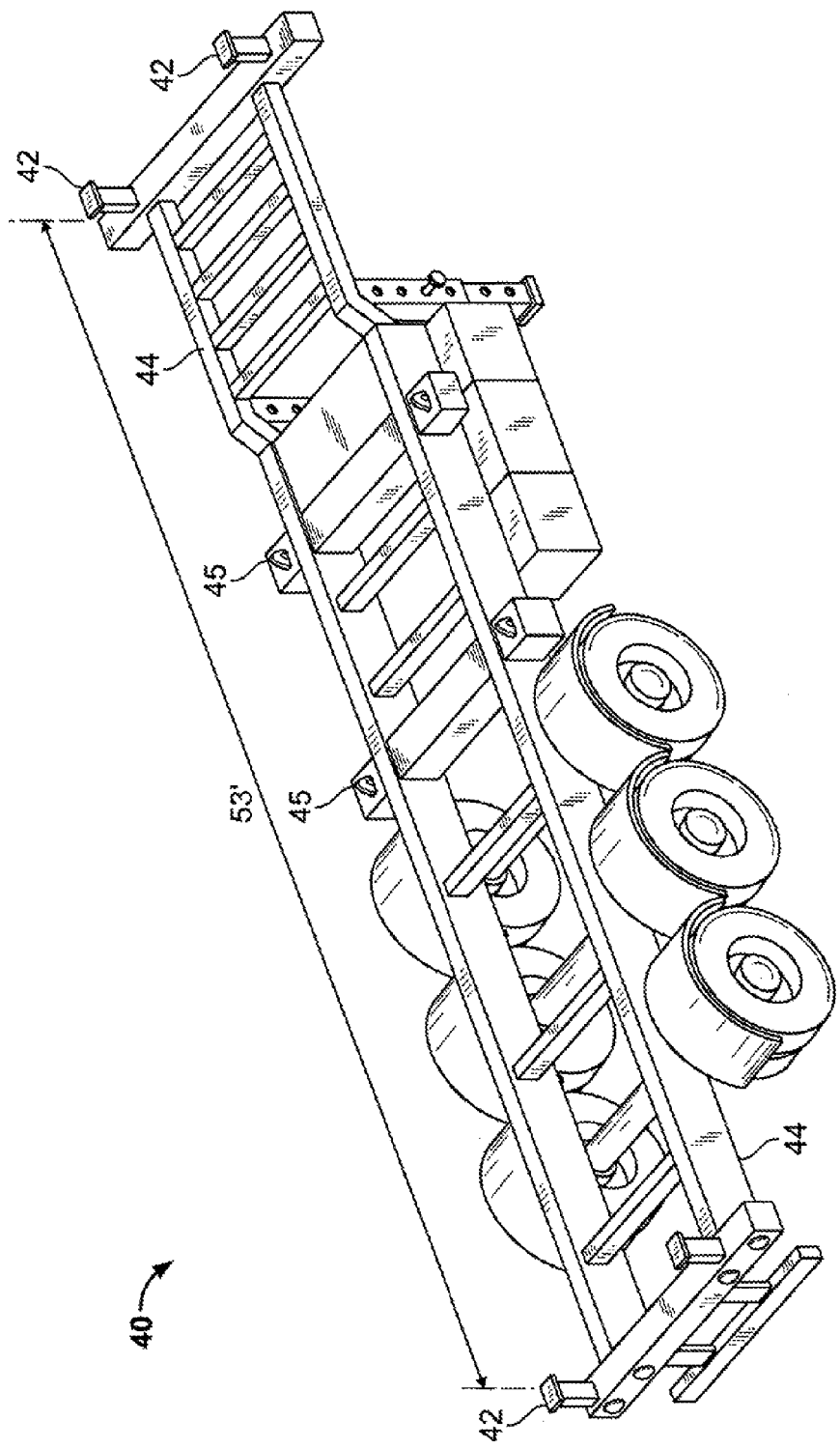
FIG. 15 is a perspective view of a standard unloaded over-the-road trailer chassis.
Figure 16:
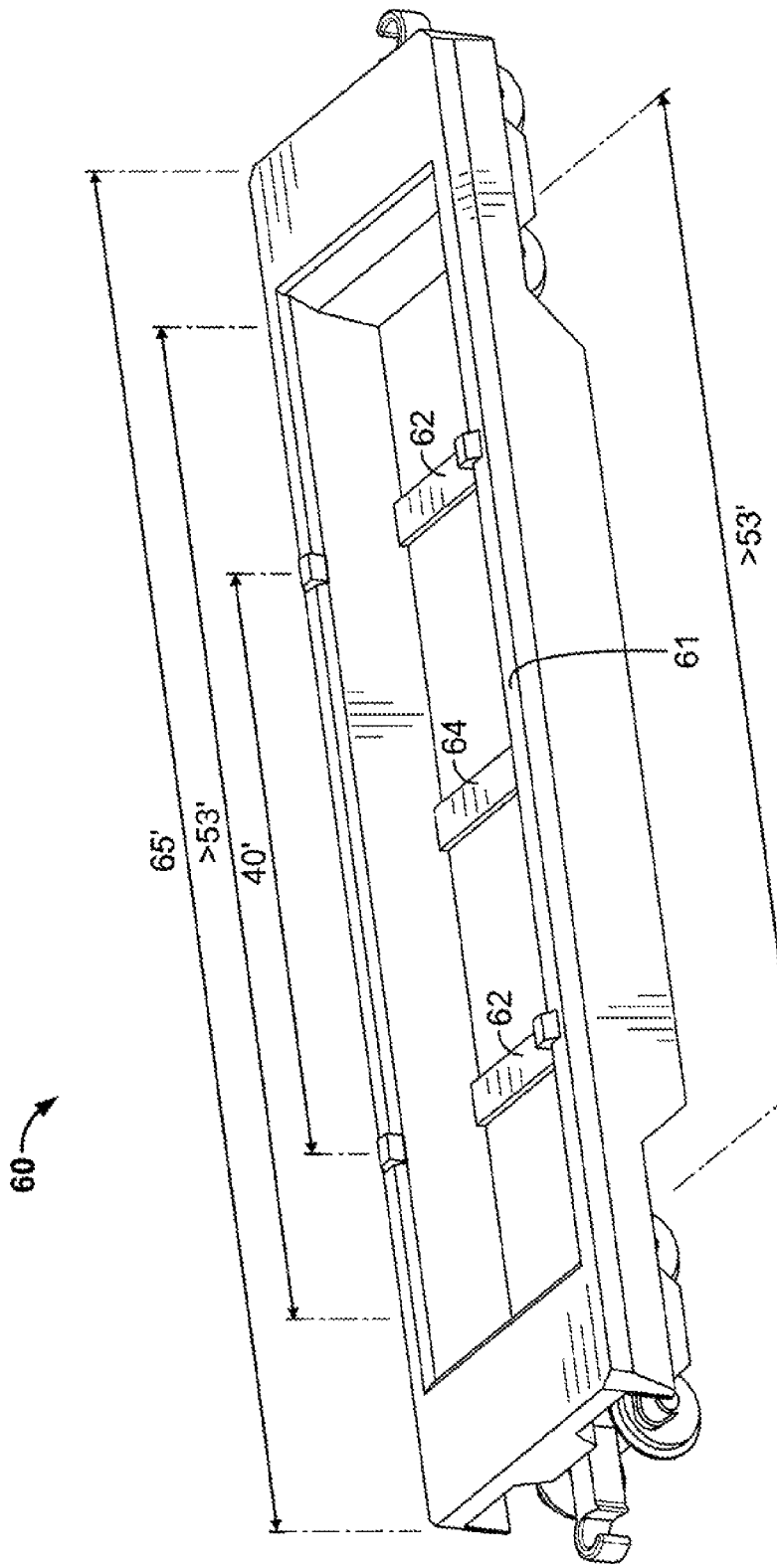
FIG. 16 is a perspective view of a standard well car used to transport intermodal containers by rail.

FIGS. 15 and 16 show existing chassis structures which help to demonstrate the intermodal nature and utility of the present invention. FIG. 15 displays a standard 53-foot trailer chassis 40. This type of trailer chassis may be used to support a flatbed up to 53 feet in length. Corner fitments 42 are positioned to accept and secure such a flatbed, which has female receptacles at these positions designed to receive the fitments. They may also be used to haul intermodal containers of varying lengths, depending on the placement of interior fitments 45. Each intermodal container also has female receptacles at its four corners—two for fitting over the rear corner fitments 42 and two for fitting over two of the interior fitments 45. The weight of the flatbed or intermodal container may also be supported by the chassis rails 44 that run the length of the trailer chassis. Though the width may vary, these rails 44 are approximately thirty-nine inches apart on a standard trailer chassis.

FIG. 16 displays a standard railroad well car 60, which is sixty-five feet in length. The well car features a well 61 which is used to house a standard intermodal container such as container 3 of FIG. 1. Though the length of the well may vary, typically it is long enough to accommodate up to at least a 53-foot long container. At the bottom of the well 61 are primary crossmembers 62 and auxiliary crossmember 64. The primary crossmembers 62 are positioned so as to correspond with the Forty Foot Points. The bottom of the well 61 may provide a solid floor or may be open to the tracks below, but standard well cars 61 will always provide support members such as primary crossmembers 62 at the Forty Foot Points to align with corresponding fitments on intermodal containers. Accordingly, a flatbed or intermodal container having fitments or support structure at its base located twenty feet from its longitudinal centerline (for rail) and twenty-six and a half feet from its longitudinal centerline (for trailers) can be transported on a standard chassis in either mode of transport.

Figure 3:
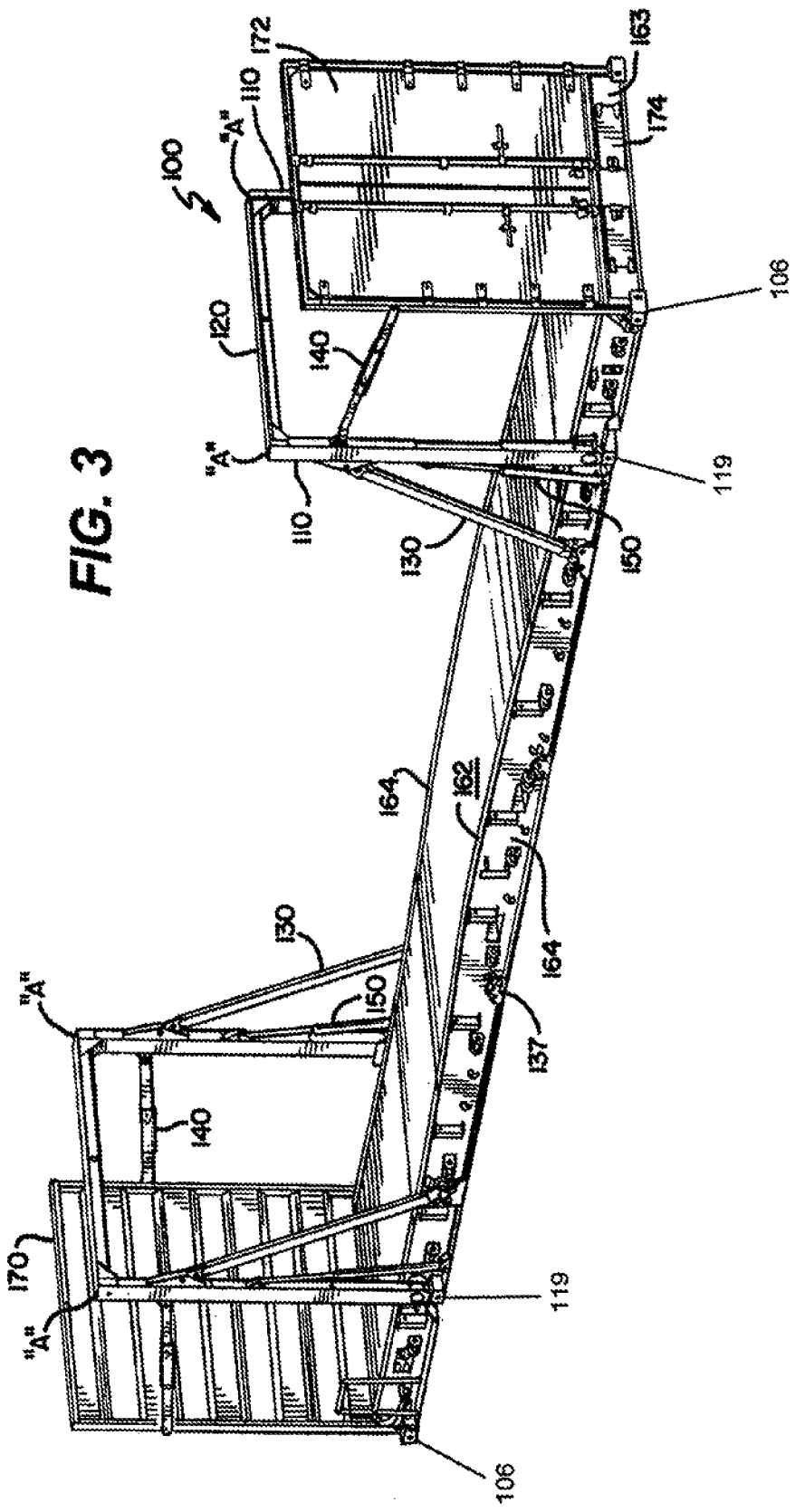
FIG. 3 is a perspective view of an intermodal collapsible transport platform in the lift or haul position according to certain embodiments.

FIG. 3 provides a perspective view of the collapsible intermodal transport platform 100 of the present invention in an erect, or lift position. As will be further explained below, the transport platform 100 has three primary positions: lift, stowed, and extended load. The lift position may also be referred to herein as the haul position, because this is the primary configuration used both to haul cargo and to lift loaded platforms, such as from one chassis to another. Thus, it will be understood that the terms "lift position" and "haul position" are interchangeable. Though dimensions are not shown, corner fitments 106 are located approximately twenty-six and a half feet from the longitudinal centerline of the transport platform 100 and are used for road transport, while stacking block receivers 119 (also fitments) are located approximately twenty feet from the same longitudinal centerline and used for railroad transport. The transport platform 100 has a deck bed 162 which stretches across two deck beams 164 running along either side of the transport platform 100. Note that the deck beams 164 differ from the prior art deck beams 26 of FIG. 2 in several ways. For example, the deck beams 164 of the present invention are not flat, but rather provide a slightly convex upper deck bed surface. The deck beams 164 are connected to one another by a series of metal crossmembers 163 that extend underneath the deck bed 164. The deck bed 164 is usually comprised of wood planks, but sheet metal or other durable material may be substituted as well.

At each end of the transport platform 100 is an end wall 170. Each end wall 170 stretches from one deck beam 164 to the other, resting on top of the outermost crossmember 163, as shown. The outermost crossmember 163 contains cutaways allowing access to storage receptacles 174 for storing components or material inside the transport platform 100. The end walls 170 may be solid walls, as shown on the distal end of the transport platform 100 in FIG. 3, or may comprise swinging cargo doors 172, as shown on the proximate end of the transport platform 100. In some embodiments, both end walls will include cargo doors, while in other embodiments, neither end wall will have them. In still other embodiments, one or both end walls, whether in fixed or door form, may comprise a steel mesh pattern so as to allow the passage of air through the end wall when in transit, but still prevent cargo from slipping off the front or end of the transport platform 100. Mesh end walls serve to reduce drag on the transport vehicle and also reduce the torque load on the end wall securements.

Also at each end of the transport platform 100 are two support posts 110, each positioned approximately twenty feet from the longitudinal centerline of the transport platform 100. The support posts 110 are structural in nature, and are designed to provide lift points for the transport platform 100 at the Forty Foot Points, designated in FIG. 3 with the letter "A". The support posts are ideally made out of high strength steel, such as QT100. Each support post 110 is connected to its counterpart on the other side of the deck bed 162 by a connector beam 120 to provide lateral support. For longitudinal support along the deck bed 162, each support post 110 is further connected to a longitudinal brace 130. Each longitudinal brace 130 is attached to a support post 110 at a first end and a deck beam 164 at a second end. Four slave rod assemblies 140 are also provided, each of which connect one of the end walls 170 to one of the support posts 110. The slave rod assemblies 140 help hold the end wall 170 in vertical alignment with the support posts 110 when the transport platform 100 is in the haul position. Finally, each support post 110 is attached to one of four hydraulic rams 150, which, as will be seen, are used to convert the transport platform 100 from the haul position to the stowed position or the extended load position. The other side of each hydraulic ram 150 is attached to the deck beam 164 further toward the longitudinal centerline of the transport platform 100 than the point along the deck beam 164 where the support post 110 is connected.

Figure 4:
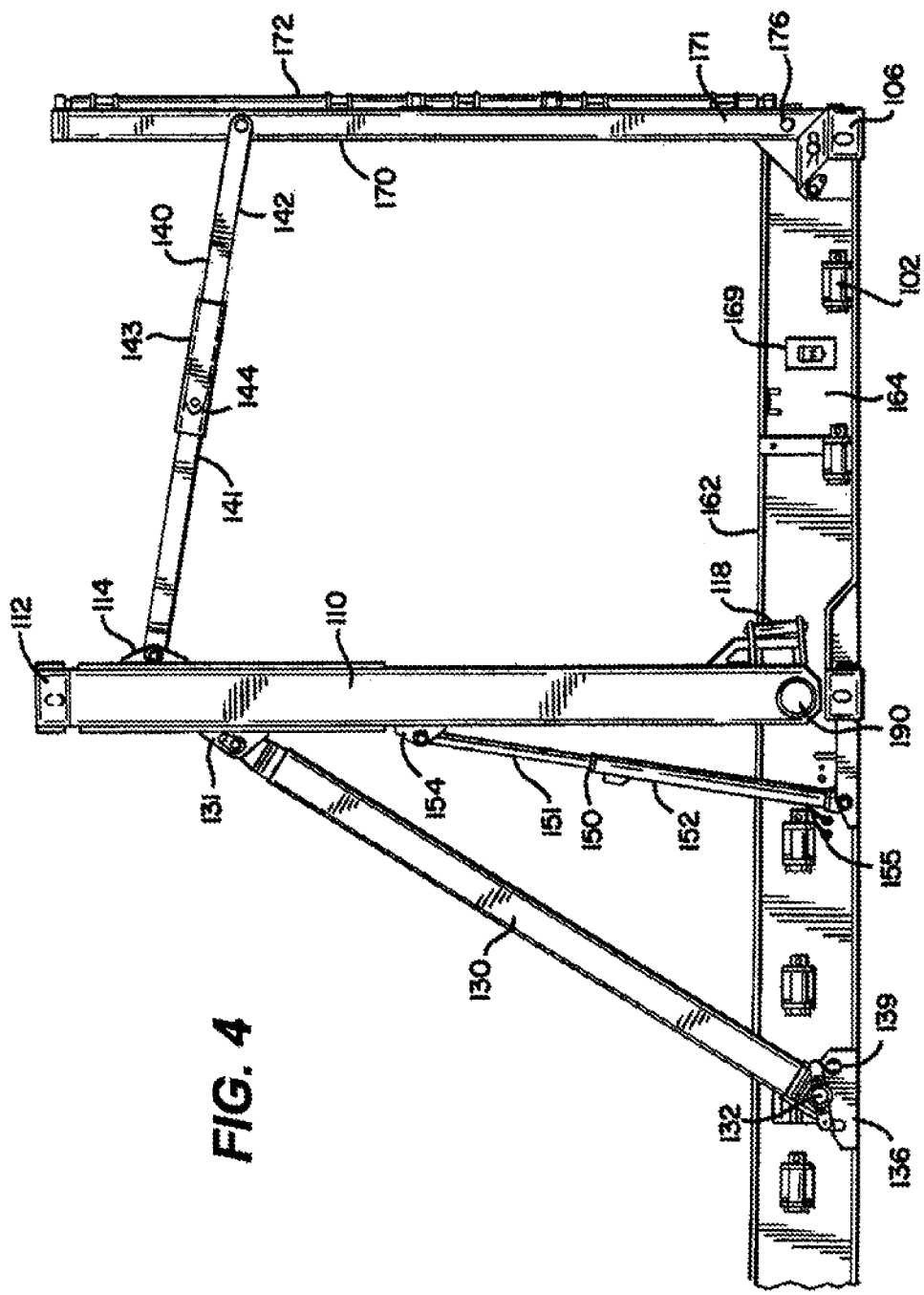
FIG. 4 is a side view of a first end of the intermodal collapsible transport platform of FIG. 3 in the lift or haul position.

FIG. 4 presents a side view of one end of the transport platform 100, still shown in the haul position. Each of the components shown in this view have counterparts at the other three corners of the transport platform 100. The support post 110 features a lifting fitment 112 at its upper end (point A on FIG. 3), which is positioned for use by overhead cranes. At its lower end, the support post 110 has a hole that is pressed over, and supported by, a rotating axle 190. As will be more clear in other views, the rotating axle 190 extends through the deck beam 164 shown, underneath the deck bed 162, through the opposing deck beam 164, and, finally, through the opposing support post 110. Accordingly, the rotating axle 190 provides an additional connection between the support posts 110 on either side of the deck bed 162. In some embodiments, the axle 190 may be disposed within an axle housing 192 that is welded or otherwise joined to the inside surface of the two opposed deck beams 164. Together, the axle 190, the connector beam 120, and the two support posts 110 form a structural ribbing that models the perimeter of a conventional intermodal container. The ribbing can withstand the same lifting and stacking loads as the conventional container walls, but, as will be seen, can be folded nearly flat to the deck bed 162.

Though the axle 190 freely rotates with the support posts 110, it is not driven in the embodiment illustrated in FIG. 4. Rather, the hydraulic rams 150 provide the driving power to rotate the support posts 110 in this embodiment. The hydraulic ram 150 is comprised of a ram housing 152, with a ram extension 151 protruding therefrom and pinned to an upper ram bracket 154 that protrudes from the support post 110. Feeding into the base of ram housing 152 are two hydraulic lines 155. One of these lines is a hydraulic input line for supplying hydraulic fluid to the ram housing 152 to extend the ram extension 151, while the other is a hydraulic output line for receiving hydraulic fluid from the ram housing 152 to retract the ram extension 151. As the ram extension 151 retracts, the support post 110 rotates inward about the axle 190 and is lowered down toward the deck bed 162. As the ram extension 151 extends, the support post 110 rotates outward about the axle 190, extending the support post 110 toward the end wall 170.

The upper end of the longitudinal brace 130 is pinned to the upper brace bracket 131 that protrudes from the support post 110, while the lower end of the longitudinal brace is pinned to the haul position brace bracket 136 mounted on the deck beam 164. As will be seen, the longitudinal brace lock pin 132 must be removed from the haul position brace brackets 136 prior to rotation of the support post 110. This is done in the illustrated embodiment by rotating the pin handles 134 approximately ninety degrees and pulling the pin outward from the deck beam 164. When not in use (i.e., during actuation of the support posts 110), the lock pin 132 may be placed in the pin storage hole 139 of the haul position brace brackets 136 to ensure the lock pin is not damaged or misplaced.

One end of the slave rod assembly 140 is pinned to a slave bracket 114 extending from the back side of the support post 110, and the other end of the slave rod assembly 140 is pinned to the end wall 170. Each slave rod assembly 140 is comprised of a first member 141 and a second member 142 pinned together at an elbow joint 144 approximately at the center of the slave rod assembly 140. The elbow joint 144 allows the slave rod assembly to flex during certain operations, as will be further discussed. Each slave rod assembly 140 also comprises a sleeve 143 that locks in place over the elbow joint 143 to prevent the slave rod assembly 140 from flexing when the transport platform 100 is in the haul position, the stowed position, or anywhere in between.

In the haul position as shown, the exterior border 171 of each end wall 170 comes to rest on corner fitments 106 positioned at each corner of the transport platform 100. An end wall safety pin 176 is inserted through the exterior border 171 to help ensure that the end wall 170 will remain in position. The safety pin 176 passes through the exterior border 171, through the deck beam 164, and locks into position behind the exterior crossmember 163. Also apparent in this view is a stacking block post 118, which is connected to the lower end of the support post 110. As will be seen, this post 118 is used to support a stacking block 116 (not shown) when the transport platform 100 is in the stowed position. Finally, there are a number of wenches 102 fixed to staggered locations along the deck beam 164.

Figure 5:
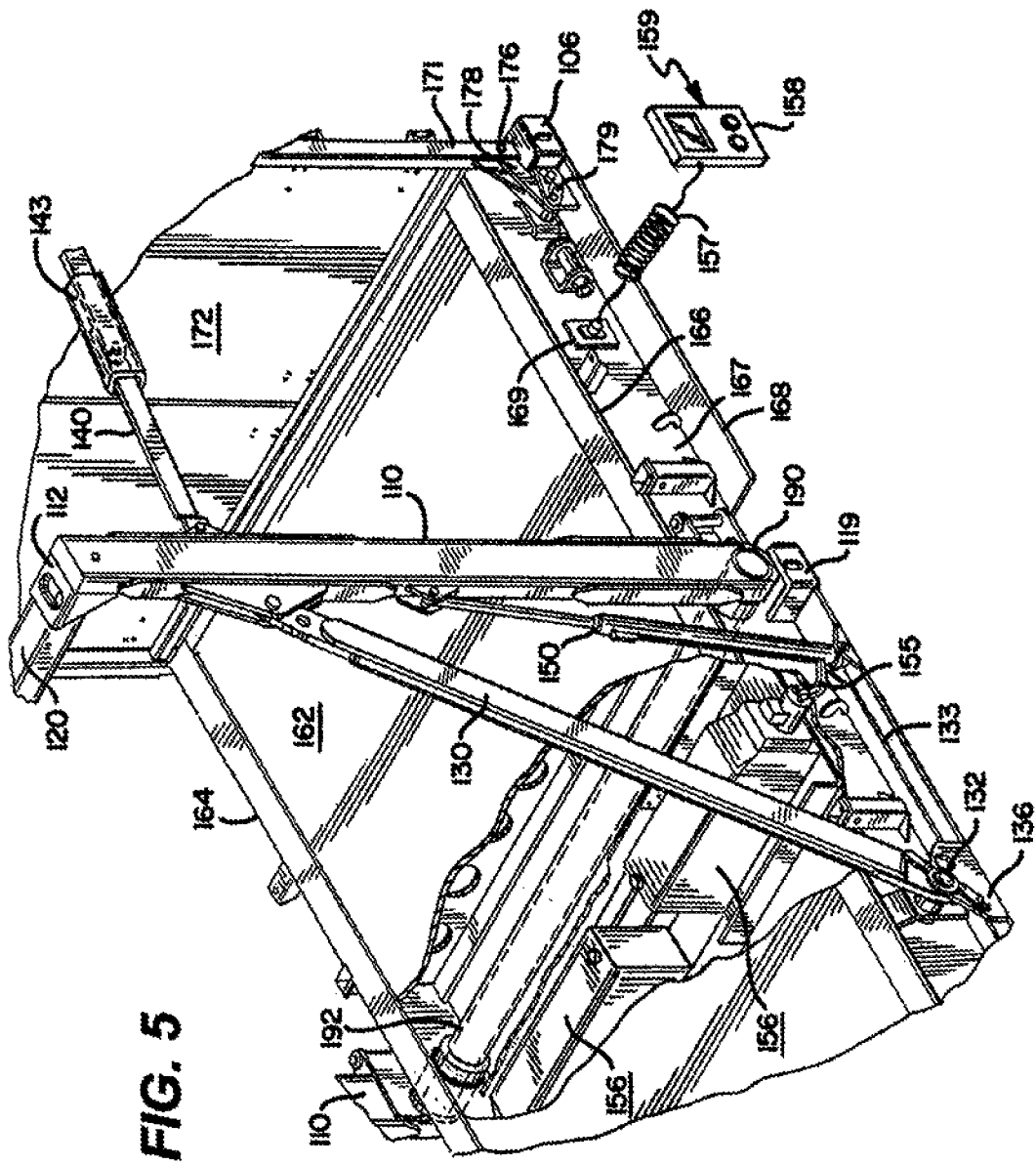
FIG. 5 is a perspective view of the first end of the transport platform of FIG. 3 in the lift or haul position, with a portion of the deck cut away to reveal certain components.

FIG. 5 shows a perspective view of the same corner of the transport platform 100 as FIG. 4. A portion of the deck bed 162 and deck beam 164 have been cut away to reveal certain underlying components. As shown, hydraulic lines 155 feed into hydraulic containment unit or "HCU" 156. Each HCU 156 includes a hydraulic reservoir and a pump/motor combination used to drive the hydraulic fluid. The HCUs 156 also include a valve system for controlling the direction of flow. Such hydraulic units are known in the art, and can be selected based on load requirements. In this case, the pressure in the hydraulic lines reaches approximately 2000 PSI during operation. Accordingly, a suitable HCU 156 would be the Monarch™ Manual 4-Way Valve hydraulic power unit, available through P&J Commercial Products.

In the illustrated embodiment, each of the four support posts 110 are driven by a separate HCU 156. However, in some embodiments, a single HCU 156 may be used at each end of the transport platform 100, such that the transport platform 100 has only two HCUs 156, each to drive a separate set of support posts 110. Alternatively, the hydraulic reservoirs of the two HCUs 156 on each end of the illustrated embodiment could be linked through a backflow line (not shown) such that each HCU 156 will effectively be harnessed to raise or lower both support posts. Use of such a backflow line will help to prevent a potential twisting moment that might otherwise be introduced as the support posts are raised and lowered should one HCU 156 produce more pressure than its counterpart on the other side of the transport platform 100.

Each HCU 156 is electrically powered, preferably by DC current, through an electrical wiring harness 157 which connects the HCUs 156 to a single electrical control unit 158. The wiring harness 157 (not shown) is packaged underneath the deck bed 162. The end of the wiring harness 157 where it connects to the control unit 158 may be extended out from under the deck bed 162 through an access panel 169 provided in the deck beam 164. This extendability allows the operator to control actuation of the support posts 110 from a distance removed from the transport platform 100, and also makes it easier for coupling to a power source, as explained below. The access panel 169 preferably has a support ledge around its inner perimeter that seats against the cutaway portion of the deck beam 164 when in the closed position so that a weak spot is not created in the deck beam 164 as a result of the cutaway. When stored, the control unit 158 and excess length of the wiring harness 157 are secured in a compartment formed on the inside of the deck beam to prevent damage during transit. While the control unit 158 is shown in a specific corner of the illustrated transport platform 100, it will be apparent that the control unit 158 could be provided at, or retained within, any point along the perimeter of the platform, according to the present invention. Alternatively, some embodiments do not provide a cutaway, and require that access to the control unit 158 be obtained by reaching under the deck beam 164. In still other embodiments, the control unit 158 is stored in receptacle 174 (see FIG. 3.)

The control unit 158 has both up and down controls for controlling the HCUs 156 to rotate the support posts 110 about the axles 190. The "up" control converts the transport platform 100 from the stowed to the haul position or from the haul position to the extended load position. The "down" control converts the transport platform 100 from the extended load position to the haul position, or from the haul position to the stowed position. Since, in the illustrated embodiment, one control unit 158 powers the HCUs 156 on both ends of the transport platform 100, the support posts on one end may raise or lower more quickly than those on the other end. Alternatively, the control unit 158 may have independent controls for operating either end of the transport platform 100, such that an operator could manipulate just one set of support posts 110 while not affecting the other set.

In order to power the hydraulic system, the control unit 158 must be coupled to an external power source. The control unit 158 provides a female receptacle 159, into which is placed a male lead from a power source. In the preferred method of operation, the power source is a common truck or fork lift battery with a connecting harness (not shown) having a male end for connection to the female receptacle 159. In this manner, access to a stationary power source is not required. At nearly any point where actuation of the support posts 110 is required, such as during loading, unloading or positioning of the intermodal transport platform 100, a suitable battery source will be available. Even if a truck or forklift cannot access the control unit 158 in a particular scenario, a generator could be used with the proper power converter to step the voltage up or down as required. Forklift batteries, and some truck batteries, may run at 12 volts, 24 volts, 36 volts, 48 volts or even 72 volts. In the preferred embodiment, the control unit 158 will comprise an internal power converter and a toggle switch to adjust for these various voltage possibilities.

By removing portions of the deck bed 162, FIG. 5 also reveals the axle housing 192 that houses the axle 190. The axle housing 192 is welded or otherwise fixed to the insides of the opposing deck beams 164, thus serving as an additional crossmember. The axle 190 is shown in hidden lines, running the length of the axle housing 192. Also shown is an end wall hinge assembly 178. Each end wall hinge assembly 178 connects to the end wall exterior border 171 to provide spacing from the end wall pivot point 179 during lowering of the end walls 170 into the stowed position. In this manner, the lower edge of each end wall 170 is prevented from grinding against the deck bed 162 during lowering. The end wall hinge assembly 178 causes the end wall 170 to lift up and off of the deck bed 162 and corner fitments 106 as the support posts 110 are rotated down toward the deck bed 162.

FIG. 5 also illustrates additional features of the deck beams 164. Each deck beam 164 comprises an upper flange 166, a lower flange 168 and a connecting web 167. The lower flange 168 extends out further than the upper flange 166 to provide a mounting surface for the lower ends of the hydraulic rams 150, the lower ends of the longitudinal braces 130, and the end wall hinges 178. In this manner, these components can mount to brackets fixed to the lower flange 168, but still have clearance for movement past the upper flange 166. In addition, the lower flange 168 provides a ledge upon which the lower end of the longitudinal braces 130 may travel during rotation of the support posts 110. This prevents the longitudinal braces 130 from simply hanging limp once the lock pins 132 are removed. It also results in a significant improvement over prior art collapsible flatbed designs, which allowed vertical members to violently fall into their collapsed position. By contrast, the raising and lowering of the support posts 110 in the illustrated embodiment is a smooth and fluid process in all respects. As shown, a guide track 133 is provided along the lower flange 168 to guide the end of the longitudinal brace 130 as it travels at a controlled rate along the transport platform 100 during support post actuation.

FIG. 6 illustrates once again that the deck beams 164 are not flat. Though the lower flange 168 is flat, the connecting web 167 is wider in the center than it is on the ends. For example, in the illustrated embodiment, though not necessarily shown to scale, the connecting web 167 is approximately thirteen inches tall at the longitudinal centerline of the deck beam (point B), and gradually trims down to only about nine inches in height at the ends of the deck beam (points C). The upper flange 166 follows this convex upper contour of the connecting web 167. In manufacturing the deck beams 164, the connecting web 167 is first welded to the lower flange 166. Then, the upper flange 168, which is initially flat, is pressed over the top edge of the connecting web 167 and welded into place.

The shape and construction of the deck beams 164 is by design, and serves multiple purposes. First, this design allows weight to be eliminated without sacrificing performance or safety. Modes of transport are usually governed by weight restrictions or limitations. For example, many U.S. states limit fully-loaded tractor-trailer combinations to 80,000 lbs. Obviously the less of this weight limit consumed by the empty tractor-trailer, the more weight can be devoted to hauling cargo. Accordingly, it is a persistent goal to reduce the weight of container designs while still providing sufficient material strength to prevent plastic deformation or other failure modes. Conventional flatbeds may accommodate heavier loads by using thicker gauge steel. However, adding steel also adds more weight, which has the negative effect of leaving less weight available for the cargo. Alternatively, a high-strength, tempered steel may be used that can withstand greater loads at a thinner gauge, but this steel is much more costly. The collapsible intermodal transport platform of the present invention uses such high-strength steel in some embodiments, but preferably only for certain components, such as the deck beams 164 and the support posts 110. More importantly, the deck beams 164 are designed such that more high strength steel is placed at the center of the transport platform 100 where the loads are typically the highest. By reducing the height of the connecting web 167 as it extends toward the ends of the transport platform 100, the present invention reduces the quantity of high strength steel used—reducing both cost and weight—while still allowing maximum loading without deformation.

Though the connecting web 167 places more high strength steel at the center of the deck beams 164, that is not the only factor that provides the deck beams 164 their strength. By pre-stressing the upper flange 166 and fixing it in a convex position over the connecting web 167, the upper flange 166 is biased in the upward direction. For a load to cause the deck beam 164 to deflect downward, it must overcome this pre-stress, which is reinforced by over fifty feet of welding between the upper flange 166 and the connecting web 167. This concept is similar to an automobile windshield. The windshield is given a convex shaped with edges fixed to the frame of the vehicle, in part, to provide pre-stress against on-coming objects. The force required to shatter an automobile windshield from the inside is, consequently, much less than the force required to shatter it from the outside. With its pre-stressed upper flange 166 and strategic positioning of high strength steel, the transport platform 100, which weighs just over 12,000 lbs. empty, can withstand loads of well over 100,000 lbs. without experiencing any plastic deformation. Meanwhile, the flexion of the deck beams 164 at the center point B during lifting of a transport platform 100 bearing a more common load of 40,000 lbs. is less than 1.5 inches.

An additional benefit to the profile of the deck beams 164, as shown in FIG. 6, is that they lend to the collapsibility and stackability of the transport platform 100. Prior art collapsible designs, such as that of FIG. 2, typically fold down to leave the vertical components of the flatbed exposed above the profile of the deck bed. The result is that those components are left to support the weight of other flatbeds or containers stacked on top. The vertical components are not usually designed to support weight when collapsed, and the weight piled on them during stacking is point loaded, or unevenly distributed, as a result of the uneven flatbed upper profile. This may result in damage to the vertical components. Moreover, the taller overall profile limits the number of flatbeds that can be stacked together for transit. Alternatively, as shown in FIG. 7, the convex nature of the deck beams 164 provides additional space for the support posts 110 and the end walls 170 to settle onto the deck bed 162, so as to cause minimal disruption to the upper profile of the transport platform 100 and to decrease the overall height of the transport platform 100 in the stowed position.

FIG. 7 shows the transport platform 100 of FIG. 6 after it has been lowered into the stowed position. Arrows are provided to show the direction of movement from FIG. 6 to FIG. 7. While the upper ends of the support posts 110 rotate toward the center of the transport platform 100, the lower ends of the longitudinal braces 130, after being unpinned from the haul position brace brackets 136, travel inward along the lower flange 168 of the deck beam 164 until they reach the stowed position brace brackets 137. Once there, the longitudinal brace lock pin 132 may be replaced to secure the lower end of the longitudinal brace 130 to the stowed position brace bracket 137. As shown in FIG. 7, the support posts 110 are substantially flat in the stowed position, with the connector beam 120 resting just above the deck bed 162. The slave rod assembly 140 is still straight, but has rotated at its pin points to the support post 110 and the end wall 170 so as to remain substantially horizontal. In doing so, the slave rod assembly 140 has pulled the end wall 170 down with the lowering of the support posts 110, such that the end wall 170 is also substantially flat and resting on or just above the deck bed 162. The upper ends of the longitudinal braces 130 are still pinned to the same points on the support posts 110, but their lower ends have moved inward such that the longitudinal braces are also substantially horizontal. Also shown in FIG. 7, stacking blocks 116 have been installed on to stacking block posts 118. Notably, in this configuration, the stacking blocks 116 form the highest point along the top profile of the transport platform 100. Accordingly, when another transport platform 100 or other intermodal container is seated on top of the one shown, none of the collapsed structure will receive any load.

Figure 8:
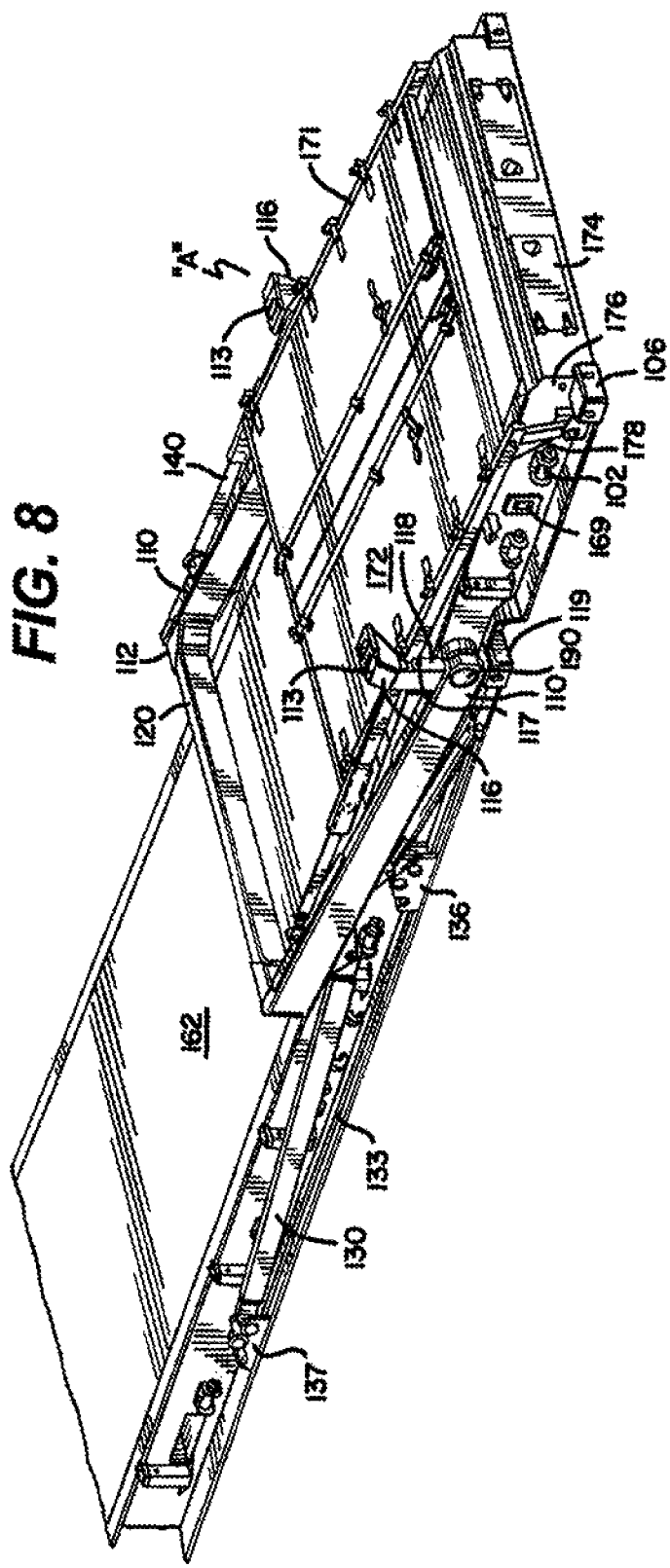
FIG. 8 is a perspective view of the first end of the transport platform of FIG. 3 in the stowed position, highlighting certain other aspects of the invention.

FIG. 8 provides a perspective view of one end of the transport platform 100 in the stowed position. The stacking blocks 116 have been removed from the storage receptacles 174 at the ends of the transport platform 100, where they are stored when not in use. Each stacking block 116 has been positioned over a stacking block post 116 and pinned in place with a stacking block retaining pin 117. When installed, the stacking blocks 116 rest over the ends of axle 190, and provide an inwardly-extending flat surface 113 on which another flatbed or conventional intermodal container may be stacked. Recall that the support posts 110 are positioned such that their upper ends provide lifting fitments 112 at the Forty Fact Points "A" when in the haul position (see FIG. 3). By positioning the stacking blocks 116 over the axle ends 190 and extending the flat surfaces 113 inward, these surfaces 113 are also at the Forty Foot Points when the support posts 110 are in the stowed position. In this manner, the stacking blocks 116 are positioned such that empty stowed transport platforms 100 may be lifted by overhead crane, or may support fully-loaded or empty conventional containers.

A drawback to this configuration is that the stacking blocks 116 prevent raising and lowering of the support posts 110 when installed. This is because, as is evident from FIG. 8, the flat surface 113 would interfere with the travel of the end wall exterior border 171. It is for this reason that, in the illustrated embodiment, the stacking blocks 116 must be installed once the transport platform 100 is in the stowed position, and removed prior to converting the transport platform 100 back to the haul position. In alternative embodiments, the stacking block post 118 provides a swivel connection to the stacking block 116 such that the stacking block may be rotated ninety degrees, extending the flat surface 113 toward the longitudinal centerline of the transport platform 100. In this manner, the flat surface 113 can be cleared of the path of the end wall 170 such that the stacking blocks 116 need not be removed during raising or lowering of the support posts 110. Rather, the stacking blocks 116 would be permanently connected to the lower end of the support posts 110, and would be rotated into stacking position automatically as the support posts 110 are lowered. The operator would then only need to manually rotate the flat surfaces 113 so as to position them at points "A" for lifting or stacking.

Below the end of axle 190 is positioned a stacking block receiver 119. The stacking block receivers 119 are for receiving the stacking blocks 116 of another transport platform 100 when the platforms are stacked together (see FIG. 9), and for centering load weight on the primary crossmembers 62 of a railroad well car (see FIG. 16). By retaining the flat surfaces 113 of each stacking block 116 inside a housing, the stacking block receivers 119 prevent one transport platform from sliding off of another when stacked. The depth of the receivers 119 may be selected so as to minimize the overall height of the transport platforms 100 when in the stowed and stacked position. The greater the depth of the stacking block receivers 119, the lower the height of a stack of platforms will be, but the receivers 119 must not be so deep as to allow components of the platforms to come into contact, such as the connector beam 120 of one platform and the lower flange 168 of the one above it. Receivers 119 are dimensioned to receive a standard ISO intermodal container fitment, such as fitments 4 in the container of FIG. 1. In this manner, empty platforms 100 in the stowed position may be stored or transported on top of a standard intermodal container.

Figure 9:
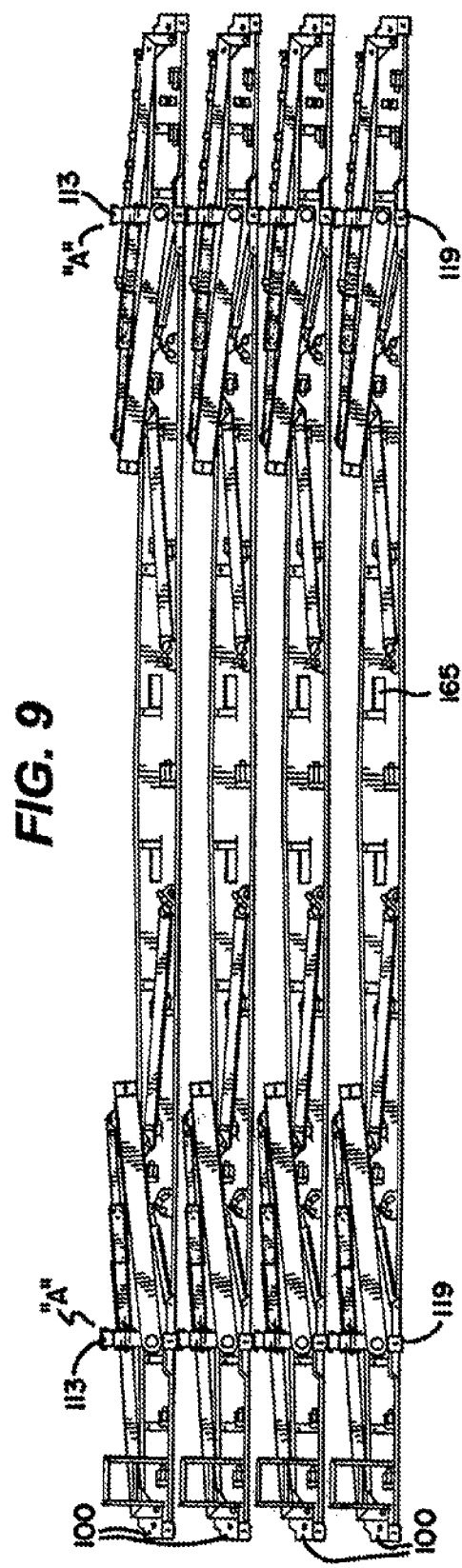
FIG. 9 is a side view of multiple intermodal collapsible transport platforms, all in the stowed position and stacked for transport, according to certain embodiments.

FIG. 9 shows four transport platforms 100 in the stowed position that have been stacked one atop the other. The transport platforms 100 can be moved by crane from the lift points "A", or by forklift using the forklift slots 165 provided in each connecting web 167. The profile of the transport platforms 100 in the stowed position is such that at least four platforms may be relocated on a standard railcar or trailer chassis without interfering with any standard height restrictions. For purposes of static storage in a yard, the platforms may be stacked much higher still.

Figure 10:
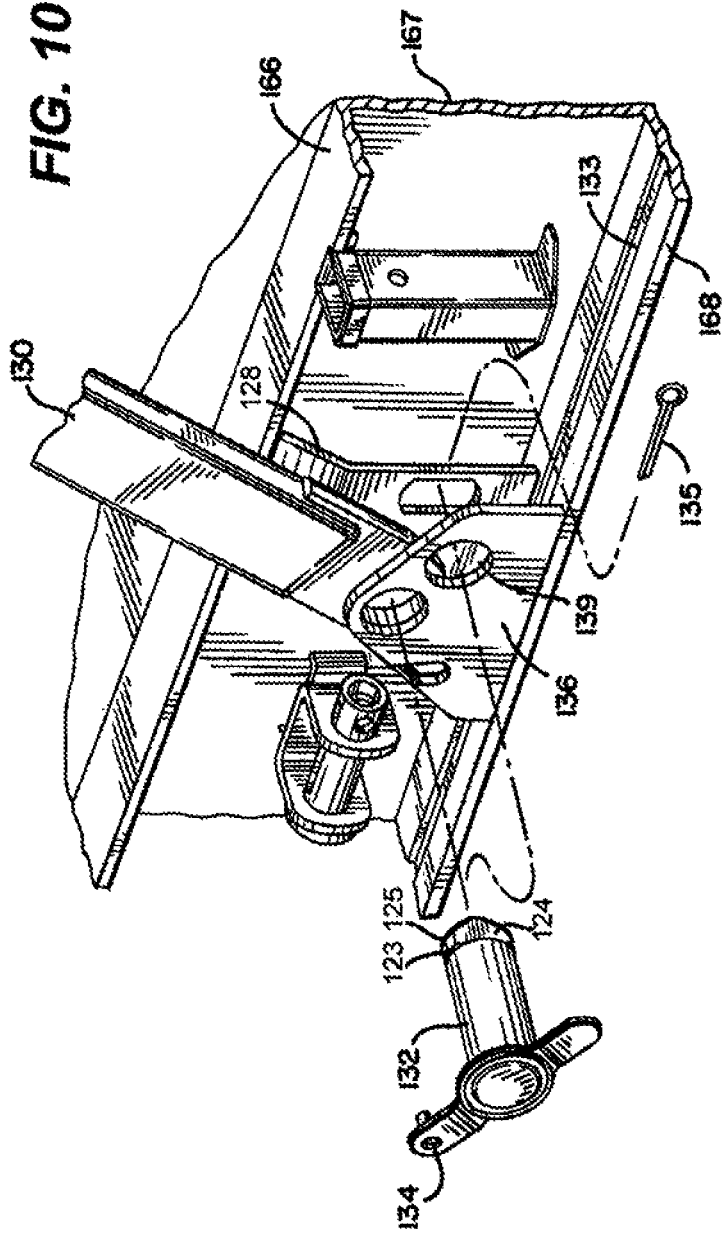
FIG. 10 is an exploded view of the longitudinal brace pin connection of the intermodal collapsible transport platform, according to certain embodiments.

FIG. 10 shows an exploded view of a longitudinal brace lock pin 132 pulled from the haul position brace bracket 136. Other than the additional pin storage holes 139 provided in the haul position brace brackets 136, they are identical to the stowed position brace brackets 137 mounted further toward the longitudinal centerline of the transport platform 100. As indicated, the lock pin 132 comprises a cylinder with pin handles 134 attached to a first end to aid in the pin's rotation. At the opposing end, the lock pin 132 has a neck 123 beyond which is an extension featuring opposing flats 124 and lobes 125. This allows for the lock pin 132 to be inserted through a substantially rectangular hole in a securing tab 128 connected to the deck beam 164 to the depth of the neck 123, and then rotated so as to lock the pin 132 in place. The lobes 125 and flats 124 narrow as they come together at the end of the lock pin 132 to provide a chamfer to ease pin insertion. Finally, a retention pin 135 is provided to prevent the lock pin 132 from rotating free once inserted and locked into place.

Figure 11:
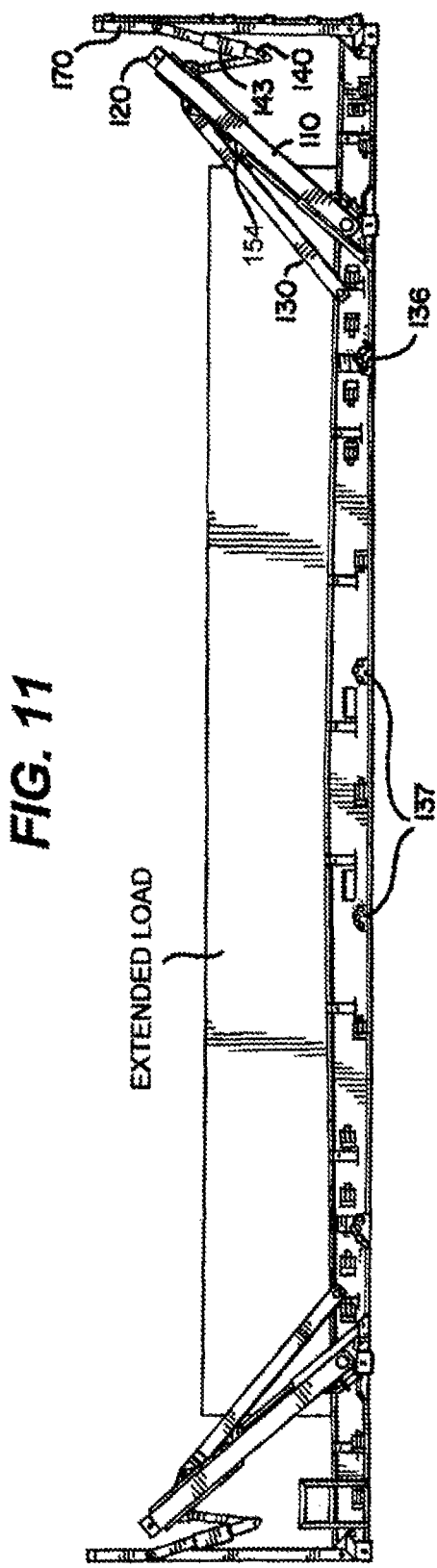
FIG. 11 is a side view of the intermodal collapsible transport platform of FIG. 3 in the extended load position, according to certain embodiments.

FIG. 11 provides a side view of a transport platform 100 in the extended load position. As previously discussed, one limitation of conventional intermodal containers is that they cannot be easily loaded, and generally are only forty feet in length. Longer flatbeds are much easier to load, and can take longer loads, but do not provide the capability of being lifted or stacked when loaded. The present invention can be easily loaded from the side or top, yet still provides lift and stack points at the Forty Foot Points. However, in the haul position, the connector beams 120 prevent loading of material that is forty feet in length or longer. To solve this problem, the transport platform 100 allows for an extended load position where the structural rib comprised of the connector beams 120 and the support posts 110 is rotated outboard about the axle 190 toward the end walls 170. Through this manner, loads up to at least forty-nine feet in length may be loaded on to the surface of the deck bed 162.

Figure 12:
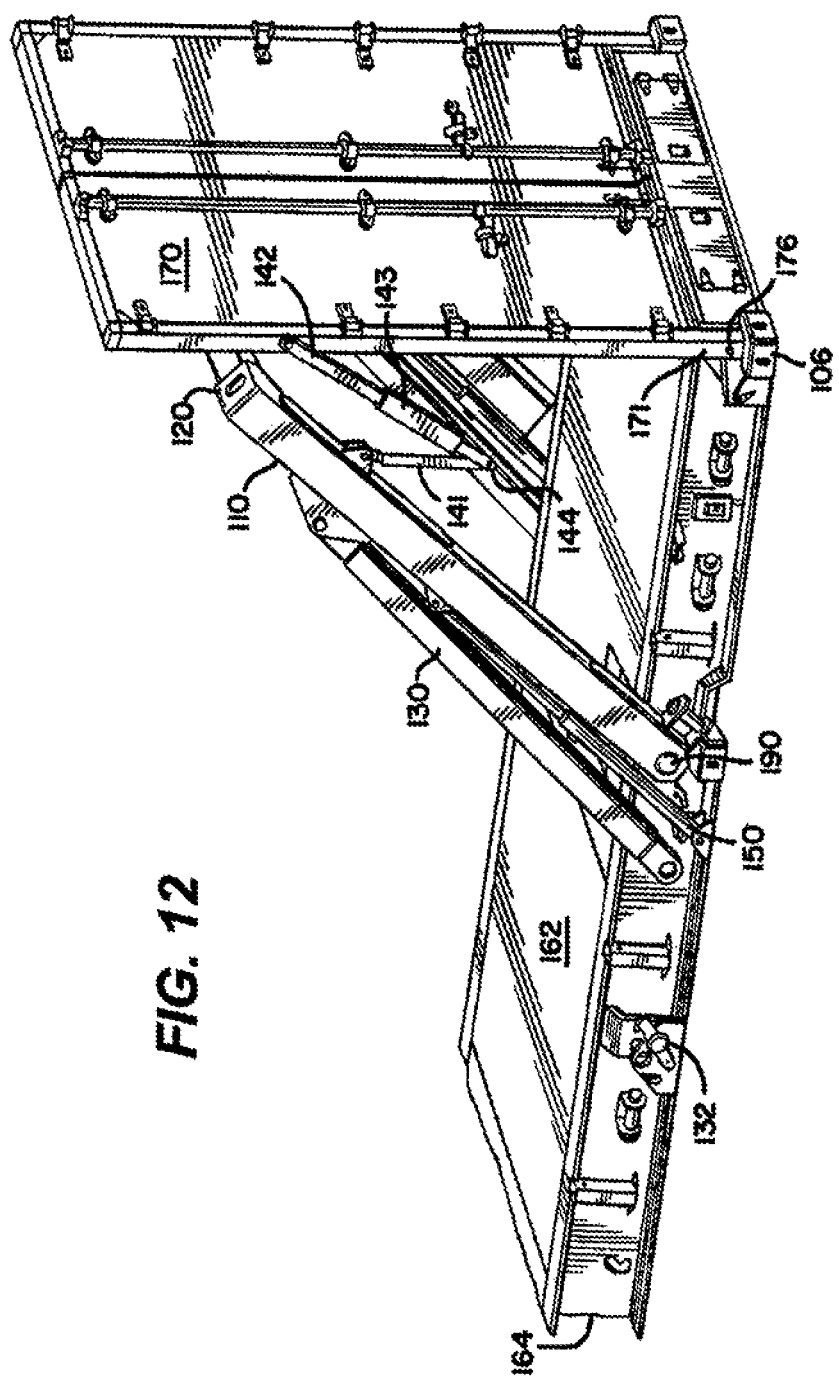
FIG. 12 is a perspective view of the first end of the transport platform of FIG. 3 in the extended load position, highlighting certain other aspects of the invention.

FIG. 12 shows a perspective view of a corner of the transport platform 100 in the extended load position. As shown, the support posts 110 have been rotated about the axle 190 almost until they have contacted the end wall 170. The design of the end wall 170 in the illustrated embodiment does not allow it to rotate past the vertical point. For example, the end wall exterior border 171 cannot rotate into the corner fitments 106. Though such end wall outward rotation is permissible in other embodiments, it is generally not desired due to external spatial constraints. For instance, if the transport platform 100 is positioned on a railcar chassis with another railcar to the front and back of it, as would normally be the case, outward rotation of the end wall 170 would interfere with the adjoining railcar. Instead, the slave rod assembly 140 is adapted to allow for outward rotation of the support posts 110 without movement of the end walls 170.

The normal role of the slave rod assemblies 140 is to slave the end walls 170 to the support posts 110, such that the end walls 170 collapse and rise as the support posts 110 are moved from the haul to the stowed position and back again. However, when moving to the extended load position, this is not desirable. Accordingly, the slave rod assemblies 140 are provided with an elbow joint 144 which joins the first member 141 and second member 142 of the slave rod assemblies. The elbow joint 144 is normally concealed and locked in place by a sleeve 143. In order for the elbow joint 144 to flex, the sleeve 143 must be moved out of the way. Once the sleeve 143 is pulled back out of its locked position, extension of the hydraulic ram 150 will cause the elbow joint 143 to flex such that the slave rod assembly 140 will no longer establish a set distance between its connection points to the support post 110 and end wall 170. The end wall 170, however, will remain in its vertical position with the support of the corner fitments 106 and the end wall safety pins 176.

Also apparent from FIG. 12 is that the longitudinal brace lock pin 132 has been removed from the lower end of the longitudinal brace 132, allowing the brace 132 to travel with the support post 110 as it extends outward. As shown, the longitudinal brace 132 is allowed to rest against the upper ram bracket 154 fixed to the support post 110. Because the extended load position is a short term position during which the longitudinal brace 130 and the support post 110 are not under load, this does not pose a concern. Once again, the longitudinal brace 130 will not slam into position against the upper ram bracket 154, but rather its lower end will travel progressively outward along the lower flange 168 in track 133 until the brace 130 comes into contact with the bracket 154 at which point the end of the brace 130 will be lifted off the flange 168 as axle rotation continues. Once the extended load is dropped down onto the deck bed 162, the control unit 158 is reversed so as to return the support posts 110 to the haul position. The lock pin 132 is then reinserted into the haul position brace bracket 136, and the sleeve 143 is slid back into position over the elbow joint 144 of the slave rod assembly 140.

Figure 13:
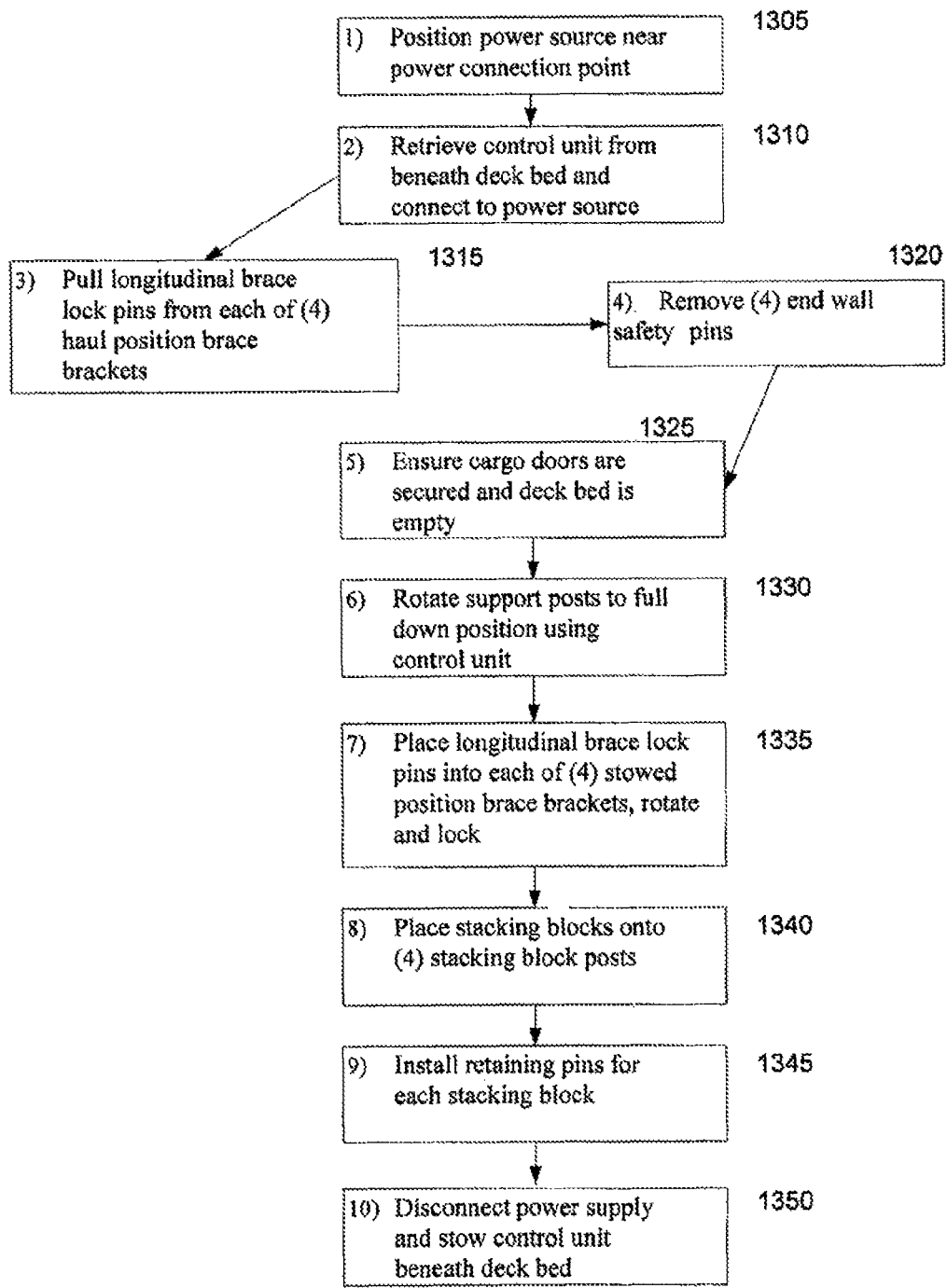
FIG. 13 is a flowchart showing certain steps taken to shift a collapsible intermodal transport platform such as that shown in FIG. 3 from a lift or haul to a stowed position.
Figure 14:
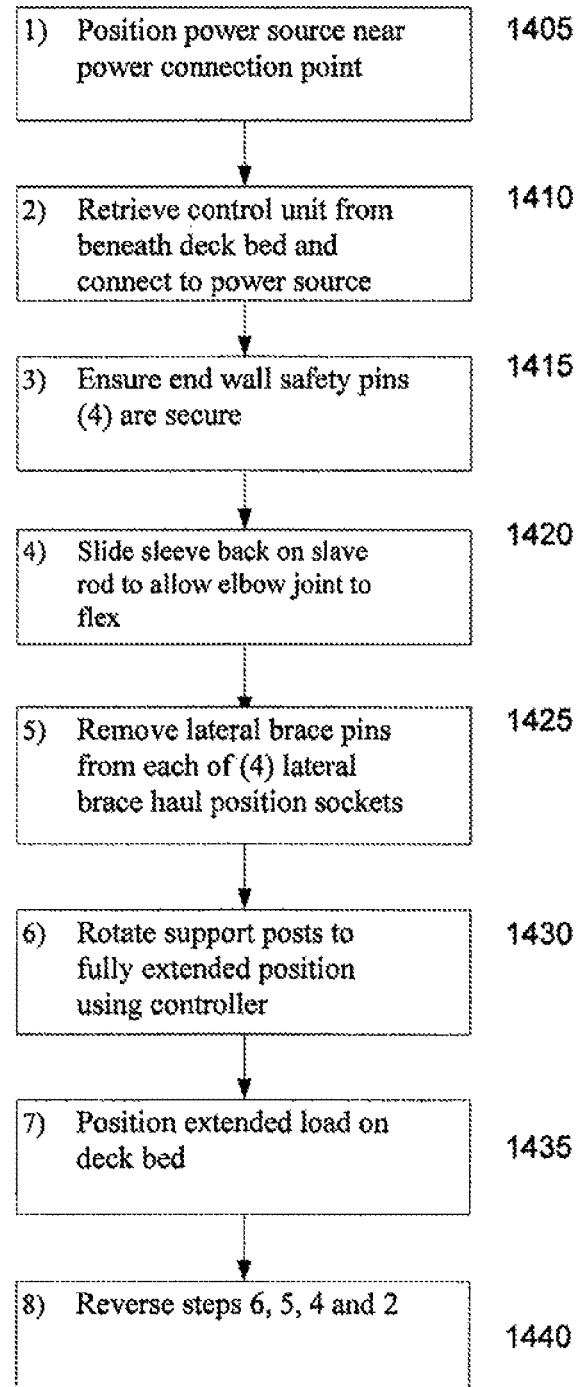
FIG. 14 is a flowchart showing certain steps taken to secure an extended load for transport using a collapsible intermodal transport platform such as that shown in FIG. 3.

FIGS. 13 and 14 are flowcharts that provide an illustration of the typical steps taken by an operator in raising and lowering the support posts 110. Specifically, FIG. 13 shows the steps one might take to convert the transport platform 100 from the haul position to the stowed position. First, at step 1305, a power source must be positioned near the storage position of the control unit 158. As discussed, the control unit 158 may be stored at any point along the perimeter of the transport platform 100. Once in place, the control unit 158 is removed and connected to the power source (step 1310). The lock pins 132 for each longitudinal brace 130 must then be rotated and removed from the haul position brace brackets 136. The lock pins 132 may be stored in the pin storage hole 139 provided. In addition, the end wall safety pins 176 must be removed from above each of the four corner fitments 106 to allow the end walls 170 to rotate with the support posts 110.

At step 1325, certain safety checks are recommended to ensure the cargo doors do not come loose, etc. The operator then uses the control unit 158 to rotate the support posts to their full down position (step 1330) and inserts the lock pins 132 into the stowed position brace brackets 137. The operator then must install the four stacking blocks 116 (assuming the transport platform 100 will be stacked with other platforms or containers). In the illustrated embodiment, these are retrieved from storage receptacles 174 and pinned to the stacking block posts 118 (step 1340). Retaining pins are inserted to ensure the stacking blocks 116 remain secure. Then, the operator may disconnect and replace the control unit 158.

FIG. 14 shows the typical steps involved with converting the transport platform 100 to an extended load position from a haul position. Once again, the power source must be located and connected to the control unit 156. A safety check to ensure the end wall safety pins 176 are in place at each corner and secure is recommended. This is because, at step 1420, the slave rod sleeves 143 will be removed from covering the slave rod elbow joints 144, disconnecting the member that otherwise positions the end wall 170 relative to the support posts 110. Once again, the longitudinal brace pins must be removed so as to allow outward rotation of the structural ribbing, namely, the support posts 110, the longitudinal braces 130, and the axle 190. The control unit 158 is then used to rotate the support posts 110 outboard until the hydraulic ram 150 is fully extended. This should occur prior to the connector beam 120 reaching the end wall 170. Once the load is set on deck bed 162, the process is reversed, replacing the sleeve 143 over the slave rod elbow joint 144, replacing the lock pins 132 through the hole in the lower end of the longitudinal brace 130 and into the haul position brace bracket 136, and returning the control unit 158 to its storage position.

Figure 17:
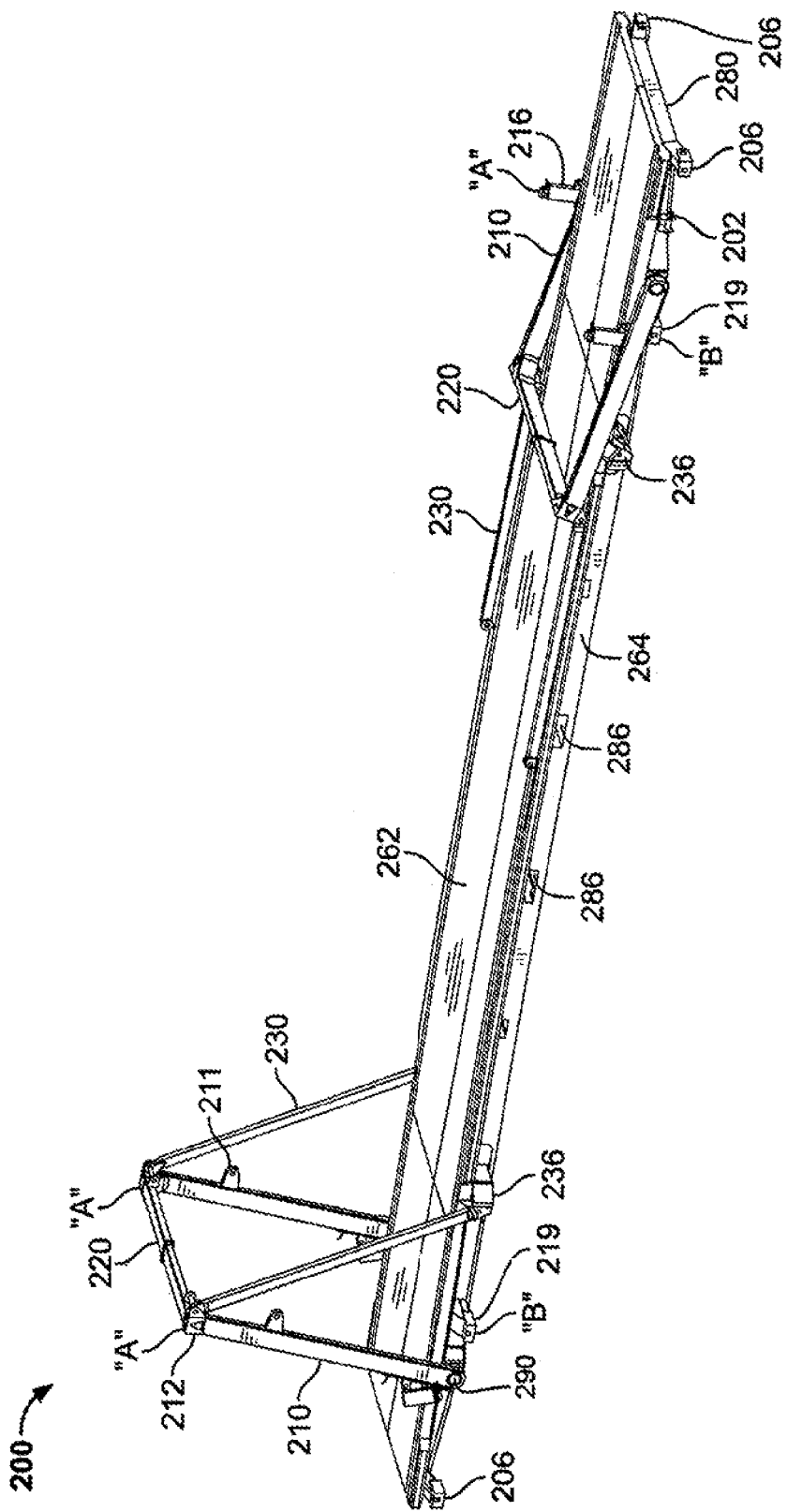
FIG. 17 is a perspective view of a collapsible intermodal transport platform in a particular configuration according to a certain embodiment.

The collapsible intermodal transport platform 200 of FIG. 17 varies in several respects from that of the collapsible intermodal transport platform 100 of FIG. 3; however, the principle concepts of a structural ribbing rotating through stowed, lift or haul, and extended load positions remain the same. Though end walls may be used with platform 200 (see FIG. 18), they are removable and not present in FIG. 17. The support posts 110 have been replaced by outboard braces 210, also referred to as first braces. Like the support posts 110, outboard braces 210 have a first end connected to a rotating axle which runs below the deck bed 262. However, axle 190 has been moved outboard and is no longer positioned in line with the Forty Foot Points. Thus, to position lifting fitments 212 along the deck bed 262 at the Forty Foot Points (designated as "A" in FIG. 17), the outboard braces 210 are rotated slightly inboard of vertical.

Each outboard brace 210 has a second end extending from the axle connection to support a lifting fitment 212. Joining the outboard braces 210 at the lifting fitments 212 are inboard braces 230, also referred to as second braces, which have replaced the shorter lateral braces 130 of FIG. 3. In fact, in the illustrated embodiment, the inboard braces 230 are actually slightly longer than the outboard braces 210. Unlike with the lateral brace 130 which primarily provided fore and aft stability during railcar jolts or acceleration/deceleration while in transit, the inboard braces 230 actually take on a substantial vertical load during lifting and stacking operations. The braces 210 and 230 together form an "A-frame," such that the lifting (tensile) and stacking (tension) loads on the lifting fitments 212 are distributed across both members, and to different points along the deck bed 262. The outboard braces 210 are larger in circumference than the inboard braces 230 in the illustrated embodiment, which may be desirable because the outboard braces 210 are connected to the moving axle and take greater moment loads during actuation of the platform. In addition, jolt loads caused by railcars bumping together or pulling away are largely absorbed by the outboard braces 210 as the loads are transmitted along the deck beams 264 to the axles 190. In the preferred embodiment, the braces 210 and 230 are both hollow tubes formed of high strength steel; however, other embodiments may use other materials, solid rods, or different shapes depending on the specific cargo load, weight and cost guidelines.

Connector beam 220 is much the same as, and serves the same purpose as, connector beam 120 of FIG. 3. Together, connector beam 220, the outboard braces 210, and the axle 190 form the structural ribbing of the platform device 220. This structural ribbing, together with the inboard braces 230, provides the strength needed for lifting and stacking that a traditional intermodal container provides, but with considerably less weight and more utility. Platform 200 rests on the same eight points as that of platform 100, namely, four corner fitments 206 and four stacking block receivers 219. In the exemplary embodiment, the corner fitments 206 are positioned approximately twenty-six and a half feet outboard of the longitudinal centerline of the transport platform to align with the corners of a standard 53-foot chassis trailer, while the stacking block receivers 219 are positioned beneath the Forty Foot Points to align with the primary crossmembers 62 of a standard railroad well car. In other embodiments, the corner fitments may be adjustable to different positions to align with chassis trailers having other lengths. Both the stacking block receivers 219 and the corner fitments 206 are designed to receive standard ISO intermodal container fitments as commonly used within the logistics industry, such as corner fitments 42 of the trailer chassis shown in FIG. 15. The platform 200 rests on at least the four corner fitments 206 when traveling over road and at least the four stacking block receivers 219 when traveling by rail. On a flat surface, the platform rests on all eight points, while one platform stacked upon another (or on a standard intermodal container) rests on the four stacking block receivers 219.

Although they differ in some respects, other components of platform 200 having related parts on platform 100 include the deck beam 264, the deck bed 262, the stacking blocks 216, sliding wenches 202 and the fork lift holes. However, in platform 200, the forklift holes are filled with forklift crossmembers 286 which receive the tines of a forklift. Noticeably absent are the hydraulic rams used in association with platform 100. As will be seen, axles 290 of platform 200 are directly driven, and, thus, no hydraulic rams are required to be in contact with any of the braces.

Unlike the deck bed 162 of FIG. 3, which is of a traditional variety such as those comprised of wood planks over a series of numerous steel crossmembers, the deck bed 262 illustrated in FIG. 17 is of a unitary aluminum construction, such as that of the Revolution® flatbed by Fontaine Trailer Company. Use of such a flatbed significantly decreases the weight of the transport platform 200, as well as the need for numerous supporting crossmembers under the deck bed 162. Each steel crossmember that can be eliminated further reduces the platform weight, thus increasing the cargo load capacity.

As shown in FIG. 17, the transport platform 200 is in a hybrid configuration wherein the left side is in the lift position and the right side is in the stowed position. Because the structural ribbing of each side may be operated independently, this is not an uncharacteristic configuration. In the lift position shown on the left, inboard braces 230 are erect, and their lower ends are pinned to brace brackets 236 along the side of the deck beam 264. The outer braces 210 are also erect, elevating lifting fitments 212 from the deck bed 262 and positioning them at the Forty Foot Points. The stacking blocks 216 of transport platform 200 need not be removed during lifting, loading or hauling operations, or for converting the platform from one position to another. Rather, the stacking blocks 216 are permanently pinned to the outboard braces 210 by stacking block pivot joints 217 (see FIG. 19A) such that the blocks rotate between a service and non-service position. When the outboard braces 210 are in the lift position, the stacking blocks 216 are folded down out of the way and into the non-service position. When the outboard braces 210 are in the stowed position, such as on the right in FIG. 17, the stacking blocks 216 are in the upright service position and comprise additional lifting fitments that can be used to lift stowed platforms.

Notably, the stacking blocks 216 are hinged to the outboard braces 210 at a position such that they are at the Forty Foot Points when in the service position on outboard braces in the stowed position. Thus, they are aligned for lifting by overhead crane or for stacking traditional intermodal containers or other transport platforms 100 or 200 on top of the transport platform 200 shown. In other embodiments, the stacking blocks may slide along a track or groove formed in the support beams without pivoting, but still in a manner allowing them to be positioned at the Forty Foot Points in the stowed configuration, yet out of the way in the lift configuration. More evident in FIG. 19, each stacking block 216 has a male fitment 218 on its top surface, which can be used to secure the stacking block 216 to a stacking block receiver 219, or to other intermodal receiving fitments that accommodate such male fitments. The male fitments are commonly referred to as twist locks or "IBCs" within the logistics industry.

When in the stowed position, as on the right hand side of platform 200 in FIG. 17, the connector beam 220, the outboard braces 210 and the associated lifting fitments 212 are no longer elevated from the deck bed 262 and come to rest in proximity to the deck bed 262. Meanwhile, the inboard braces 230 are splayed out forward along the top surface of the deck bed 262. As is more clear in FIG. 19, the inboard braces do not pin to the deck beams. Rather, they travel along the deck bed 262 on wheels 232, and can be secured as needed with chains or other tie downs for transit if desired. The structural ribbing is held into the stowed position with the same brace brackets 236 that are used in the lift position. As will be discussed in association with FIGS. 22 and 22a, the same lock pin 240 is used in the same housing for both the stowed and lift positions. The only thing that changes is what is being secured, namely the lower ends of the inboard braces 230 in the lift position, and the stowage lock brackets 211 in the stowed position. The stowage lock brackets 211 are fixed to the outboard braces, as shown on the left side of FIG. 17.

Figure 26:
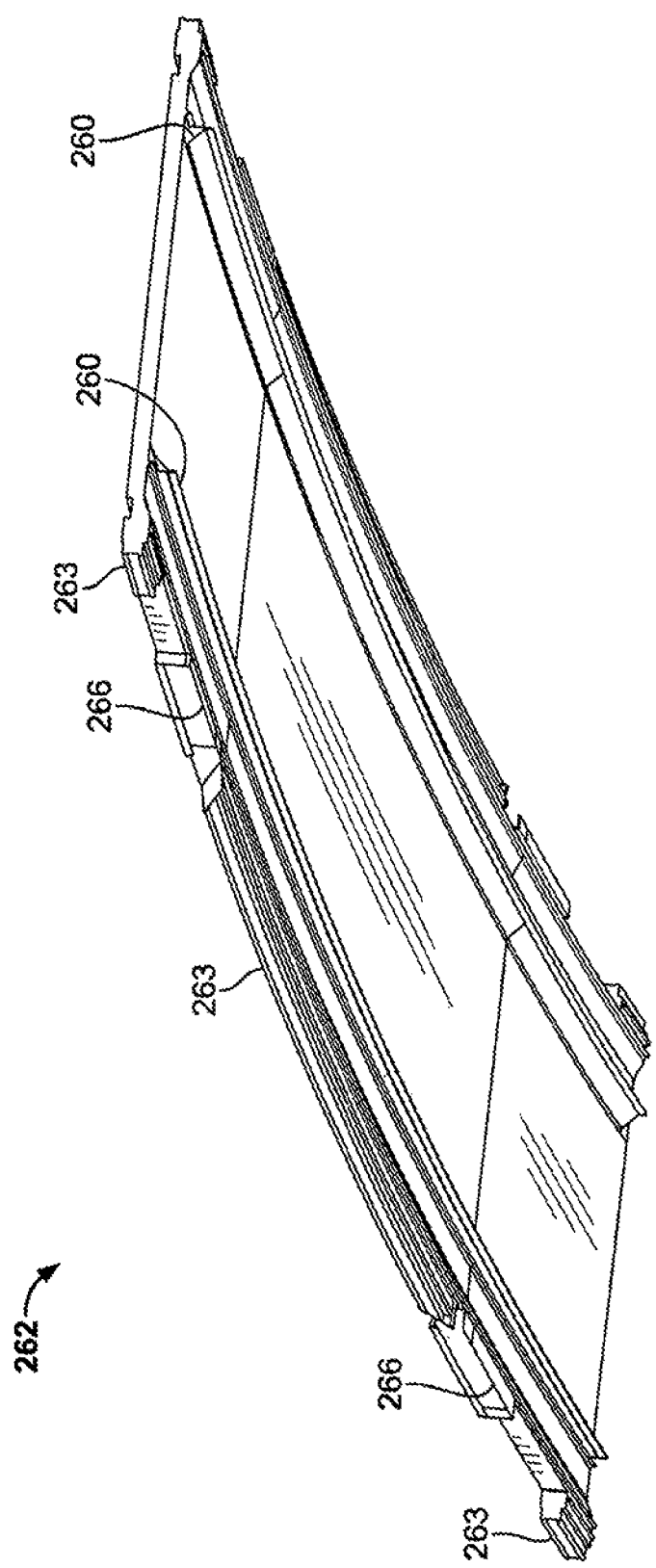
FIG. 26 is an isolation view of the underside of a deck bed, such as that in FIG. 17, from a particular angle where the arc of the deck bed is apparent.

As is more clear in FIG. 26, the deck bed 262 still has a slightly arcuate upper surface and a slightly concave lower surface. This profile allows the deck bed 262 to conform to the slightly convex upper edge of the webbing 267 of the deck beams 264. As in the case of deck beams 164 of FIG. 6, the lower edge of the webbing (167/267) and the lower flange (168/268) are flat along most of their length. The unique profile of the webbing that results, where it is taller in the center and shorter on the ends, provides unexpected beam strength. However, as clearly shown in FIG. 18, the lower flange 268 and lower edge of the webbing 267 are trimmed away once past the points of attachment of the outboard braces 210 in the case of platform 200. This is because load requirements quickly fall off outboard of these points, and the additional strength is not necessary. By removing this excess steel, the platform 200 is lighter and can support a greater cargo load within governed weight restrictions. To compensate for the rise in the lower flange 268 as it extends toward the ends of the platform 200, corner fitments 206 are extended downward off of the end crossmembers 280 so as to remain in a plane with the stacking block receivers 219 beneath the Forty Foot Points.

Figure 18:
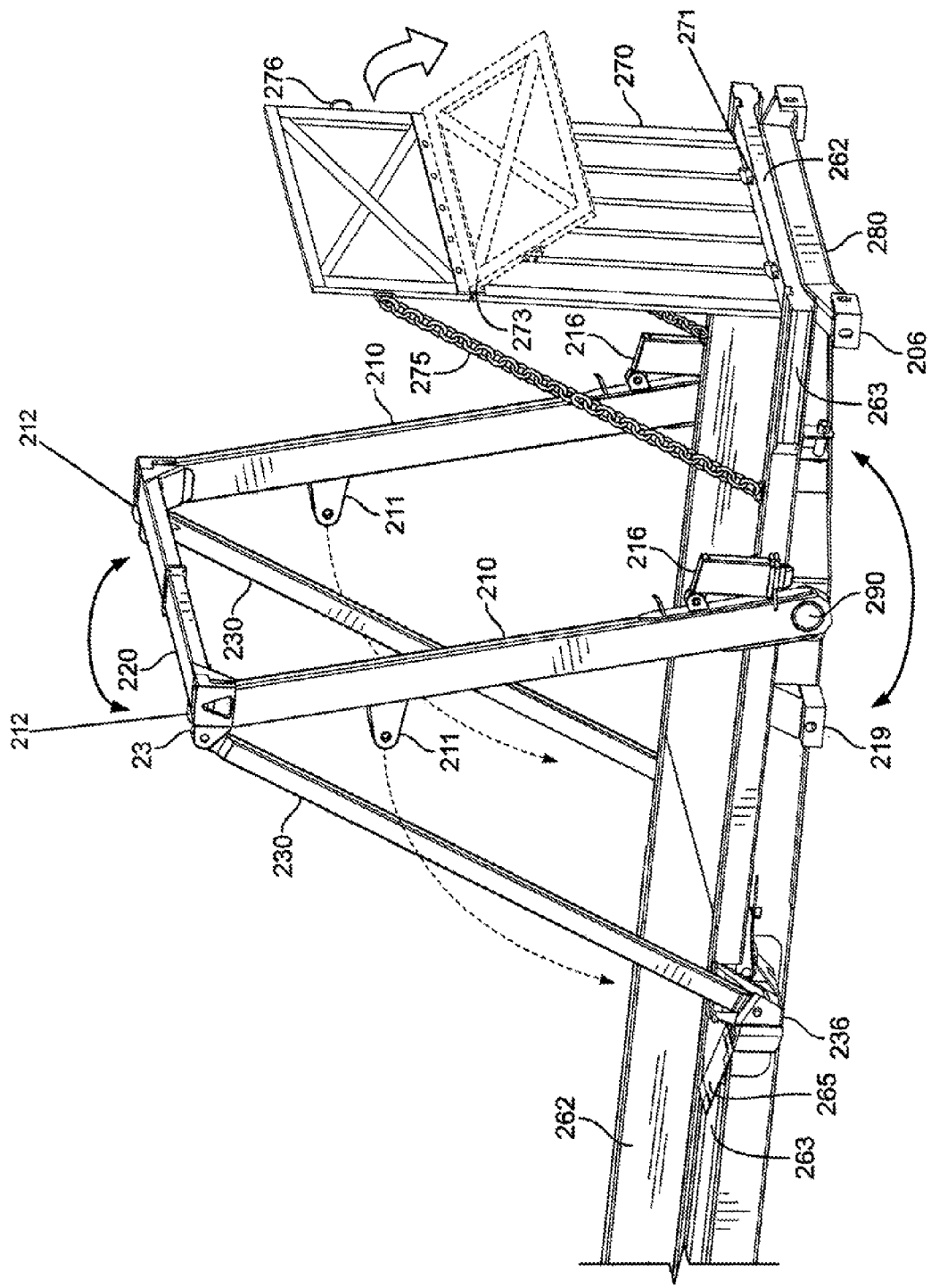
FIG. 18 is a perspective view of a corner of the transport platform of FIG. 17 showing the braces in the lift or haul position.

FIG. 18 provides a closer view of one end of a collapsible intermodal transport platform 200 in the lift configuration. Here, the A-frame pattern formed by the braces 230 and 210 is clearly evident. Arrows have been added to show the travel of the various components of the structural ribbing as axle 290 is rotated about its axis. As shown, the axle 290 is long enough to extend beyond either side of the deck bed 262, connecting to the outer braces 210 at points wide enough to allow the braces to rotate without interference to the deck bed 262. The stacking blocks 216 are in their flipped-down, non-service positions so as to protect them from loading and unloading of cargo. Dotted arrows show the travel of stowage lock brackets 211 as they would descend to lock in at the brace brackets 236 in the stowed position. The brace brackets 236 are presently securing the ends of inboard braces 230. Though not fully visible, the deck bed 262 provides ramp 265 which leads from the surface of the deck bed 262 down into a pocket formed by the brace bracket 236 where the lock pin 240 secures the end of the inboard brace 230. The end of the inboard brace comprises a wheel 232 (see FIG. 19) which rolls upward along the ramp 265 as the axle 290 is rotated inboard. The ramp 265 extends to the top surface of the rub rail 263, which runs nearly the length of the deck bed 262. To allow for movement of the outboard brace 210, there is no rub rail 263 between the axle 290 and the brace bracket 236. However, it reappears toward the ends of the deck bed 262 as shown.

The rub rail 263 not only extends the length of the deck bed 262 to provide a shelf on which the inboard brace wheel 232 can travel, it also provides grooves allowing for the selective positioning of sliding wenches 202 that can be slid along the rub rail 263. Though only one sliding wench 202 is shown for simplicity, many sliding wenches 202 may be deployed along the rub rail 263 to secure cargo. Though other methods could be used, the sliding wenches 202 in the illustrated embodiment are held in place by grooves running along the underside of the rub rail. One method of providing such grooves for wench retention is set forth in U.S. Pat. No. 7,568,754.

Also featured in FIG. 18 is one embodiment of an optional end wall 270. The end wall 270 is used primarily for providing an end buffer for cargo loads when other tie down means require augmentation. Use of an end wall 270 will create drag when the transport platform is in motion. Though the end wall 270 is preferably made of a mesh material to allow the passage of air, the drag will not be completely eliminated. Thus, for many loads, an end wall is not necessary and may simply be removed or stored flush against the deck bed 262. End wall 270 provides a thin, lightweight boundary that may be repositioned or removed with minimal effort.

Chains 275 attach to eyelets 276 to help secure the end wall 170 to the deck bed 262 when the platform 200 is in transit. Though not shown, the chains 275 may be secured to a sliding wench 202, or to other fitments on the deck bed 262. The tie-down angle and positions of the chains will depend on the distance of the end wall 270 from the end of the deck bed 262, and the direction of travel of the platform 200. Unlike the end wall 170 of the platform 100 shown in FIG. 3, the end wall 270 illustrated in FIG. 18 is not attached to any braces or beams, and does not necessarily rotate down to the deck bed 262 in tandem with the support posts or braces. Furthermore, it is not necessarily fixed to the end of the platform 200. Rather, the end wall 270 may be positioned at any distance inboard of the end of the deck bed 262 and secured directly to the deck bed 262 at its base. The exterior dimensions of the end wall 270 may be such that it can even be positioned underneath the A-frame formed by the braces 210 and 230. Two end wall fitments 271 are used to secure the end wall 270 to the deck bed 262. Though any number of hooks or fastening means could be used to secure the base of the end wall, the construction and use of fitments similar to end wall fitments 271 is disclosed in U.S. Pub. No. 2009/0028658, wherein lateral grooves in the deck bed surface are used to retain the fitments, which can then be slid across the deck bed from either side.

The top portion of end wall 270 sits atop a piano hinge 273, and may be folded down for securing shorter loads. This reduces the wind-resisting surface area of the end wall, and is, thus, preferred when feasible. It will be understood that the piano hinge 273 could be located at various points along the height of the end wall 270, thus creating a top portion and bottom portion of various sizes. In some cases, a second piano hinge may be added such that the fold-down height might be as little as one third of the full height. In other alternatives, the end wall 270 could comprise a sliding track fixed to a lower portion upon which an upper portion may move up or down. This would allow the height to be infinitely adjustable between the full height and the height of the lower portion. It may also be desirable to reduce the surface area by narrowing the width of the end wall. Thus, while the end wall always extends between the two sides of the deck bed 262, it may not necessarily extend all the way across the deck bed in certain embodiments. In some embodiments, the end wall is laterally extendable from a width where it only extends partially across the deck bed 262 to a width where it extends completely across the deck bed 262.

Figure 19:
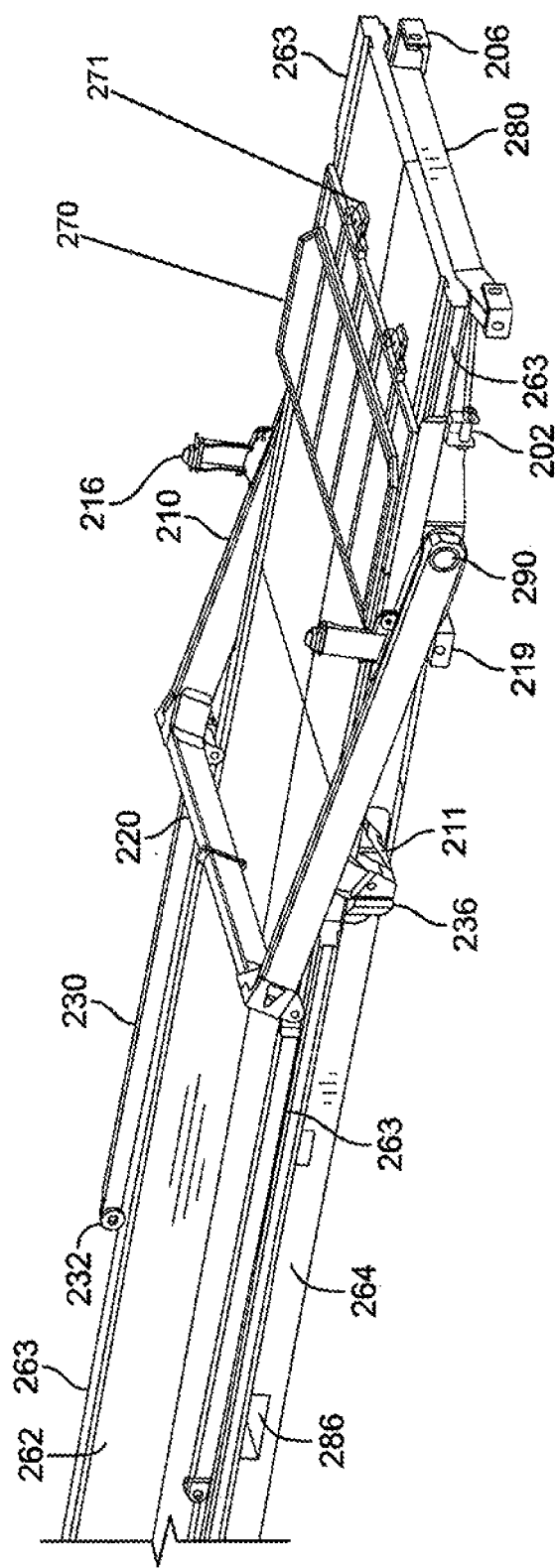
FIG. 19 is a perspective view of the same corner as that shown in FIG. 18, but with the braces in the stowed position.

FIG. 19 shows the same view of the transport platform as FIG. 18, but the structural ribbing has been rotated down into the stowed position and the stacking blocks 216 have been raised into a service position to receive a container or another transport platform. The stowage lock brackets 211 have been lowered into the receptacles formed by the brace brackets 236 and pinned into place with the lock pin 240 (not shown). The inboard brace wheel 232 is clearly evident on the end of the far side inboard brace bracket 230, which is now laid down flush with the surface of the deck bed 262 along the rub rail 263. The axle 290 is positioned along the deck bed 262 not only such that the stowage lock brackets 211 align with the brace brackets 236, but also so that the outboard braces 210 do not pivot into contact with the stacking block receivers 219 when fully lowered. Also note that the end wall 270 has been lowered down against the deck bed 262 into a non-service position. This made possible in the illustrated embodiment through the swivel action of the end wall fitments 271, which still serve to retain the end wall 270 even when fully collapsed. In other cases, it may be desirable to completely remove the end wall 270 and store it beneath the deck bed 262.

Figure 19A:
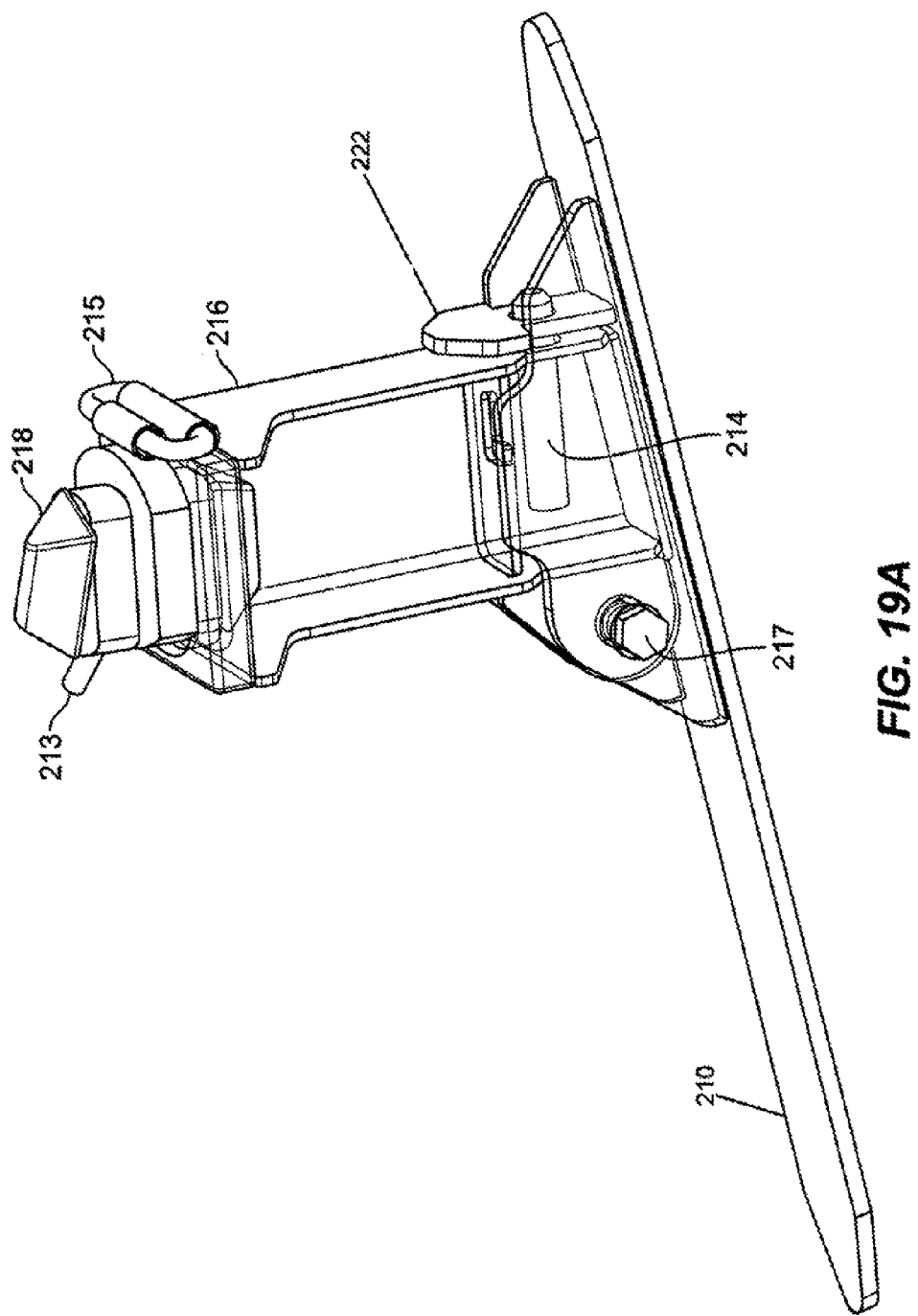
FIGS. 19A and 19B are isolation views of a stacking block in the service position with and without the male fitments installed.
Figure 19B:
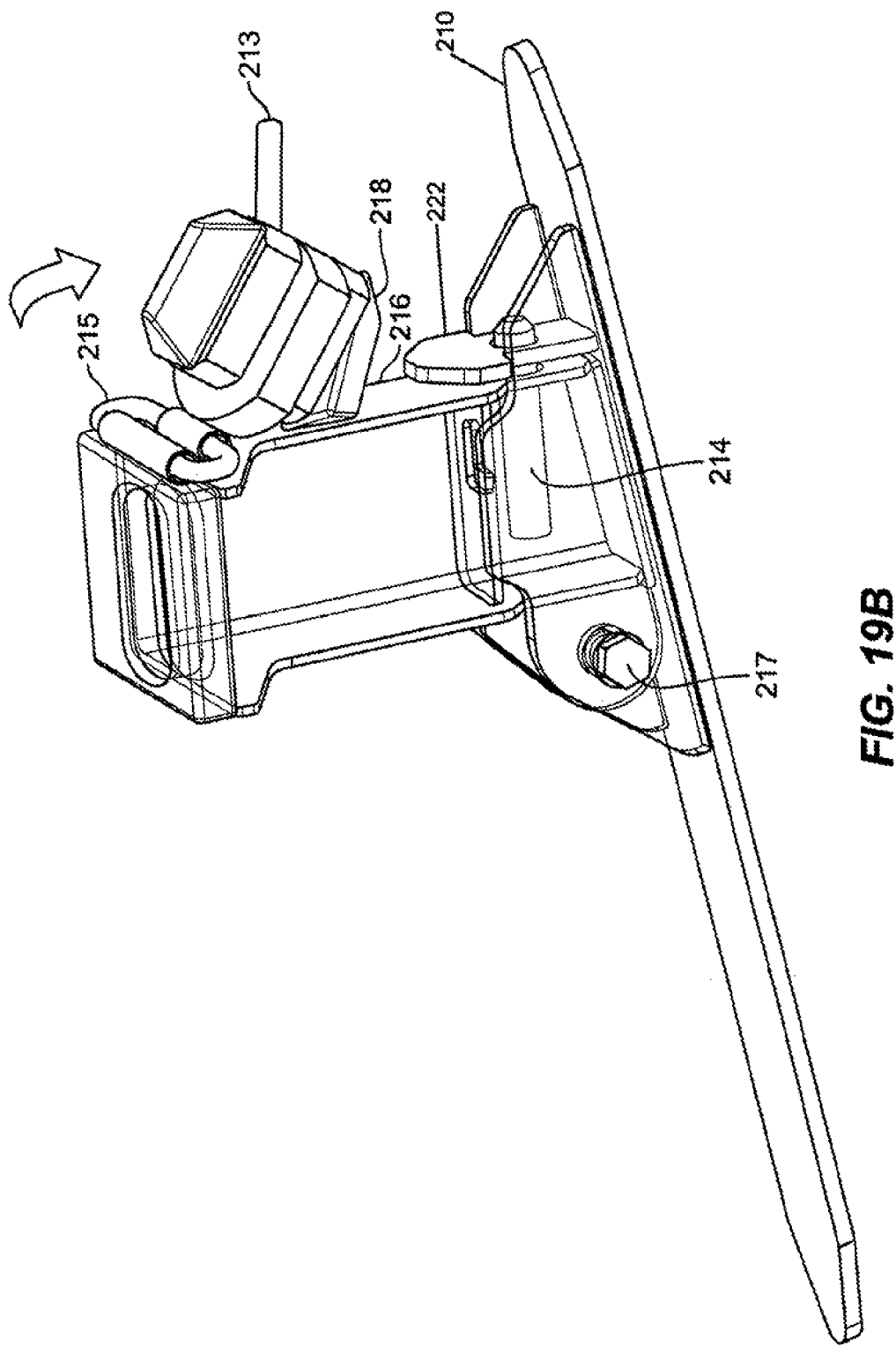

Though difficult to tell from the perspective view, the stacking blocks 216 are tall enough to provide sufficient clearance over the connector beam 220. In the illustrated embodiment, when one transport platform 200 (or a standard intermodal container) is loaded over another transport platform, there is nearly thirteen inches of clearance between the top of the connector beam 220 on the lower transport platform 200 and the lowest overhead component of the upper transport platform 200 (or bottom surface of the standard intermodal container). FIGS. 19A and 19B provide close-up views of a stacking block receiver 216 in the service position. That is to say, the stacking block 216 has been rotated about stacking block pivot joint 217 such that the spring pin 214 has extended through the spring pin retainer 222, holding the stacking block 216 upright against the lowered outer brace 210. In FIG. 19A, the male fitment 218 has been rotated about the male fitment pivot joint 215 to seat across the standard ISO lifting fitment 212 of the stacking block 216 and locked in place using the handle 213. This may be referred to as the male fitment service position. In this configuration, the stacking block 216 is prepared to be inserted into a stacking block receiver 219 of another transport platform or have a standard intermodal container be stacked on top.

In FIG. 19B, the male fitment 218 is shown in its non-service position, removed from the standard ISO lifting fitment 212 of the stacking block 216 by rotating it back along male fitment pivot joint 215. In this position, the stacking block 216 presents lifting fitments 212 for lifting by a standard overhead crane. Thus, a crane can be used to lift a transport platform 200 in either the stowed or the lift configurations. Moreover, using the male/female connections provided by stacking blocks 216 and stacking block receivers 219, a crane could lift at least four transport platforms stacked on top of each other at the same time. Though not shown, stacked transport platforms 200 would look much the same as the stacked transport platforms 100 of FIG. 9. In this case, the stacking blocks 216 of the lower three transport platforms would have their male fitments in the service position and locked to the stacking block receivers 219 of the transport platform directly above, while the stacking blocks 216 of the uppermost transport platform 200 would have its male fitments in the non-service position, prepared to receive the lifting implements of the overhead crane. The male fitments are preferably rated to fifty tons in either direction to allow robust usage.

Figure 20:
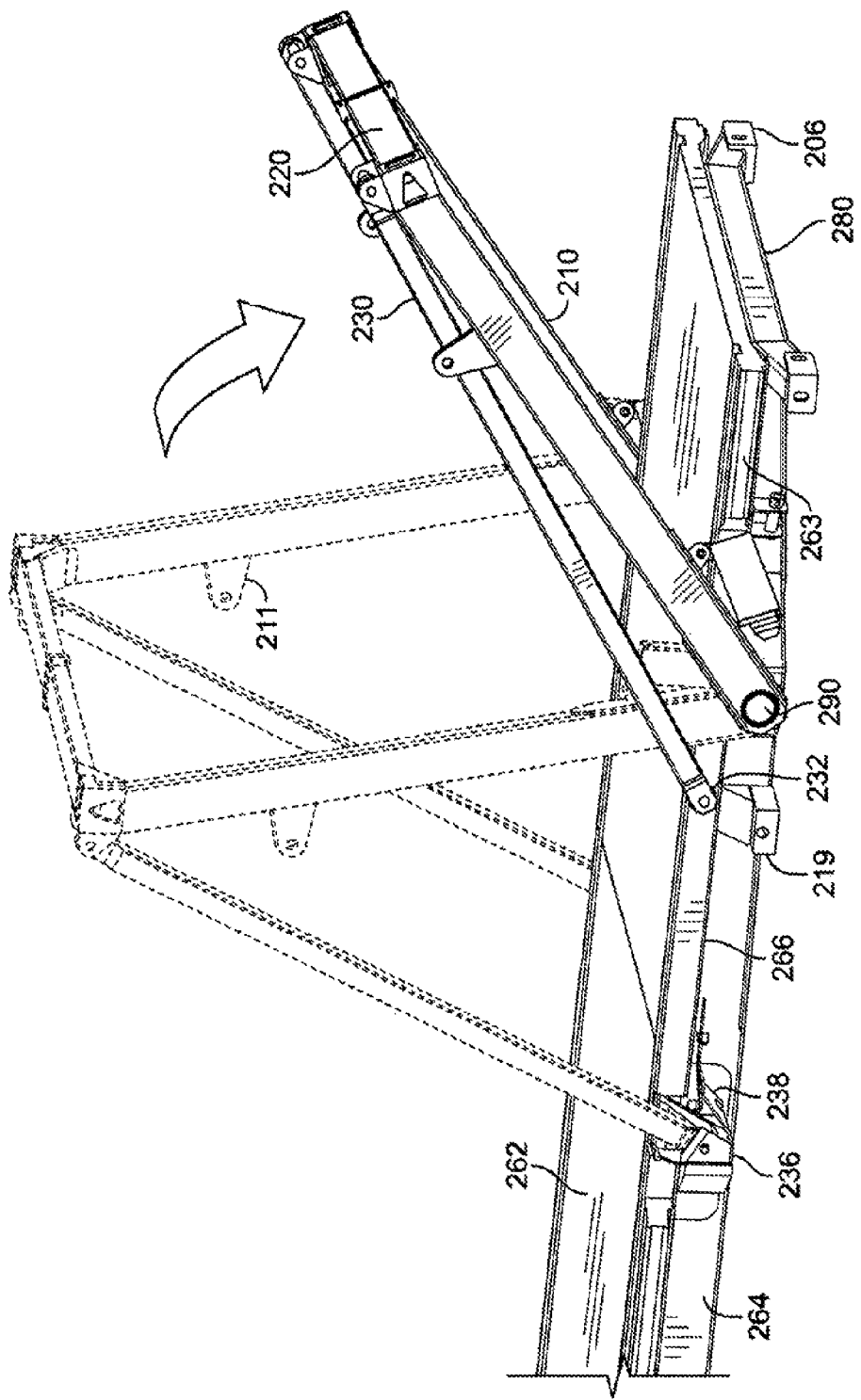
FIG. 20 is a perspective view of the same corner as that shown in FIG. 18, but with the braces in the extended load position.

In FIG. 20, the same view of the transport platform 200 is provided, but here the structural ribbing has been rotated outboard to the extended load position. In the illustrated embodiment, outboard rotation is not constrained by an end wall, because no end wall is present. If desired, end walls could be installed at the appropriate locations along the length of the deck bed 262 once the cargo is deposited. As axle 290 rotates outboard, outboard braces 210 rotate outboard as well, pulling the inboard braces 230 with them. As this occurs, the inboard brace wheel 232 is pulled up the back support 238 of brace bracket 236 and along roller track 266. The roller track is provided to retain the inboard brace wheel 232 during movement to and from the extended load position because the rub rail 263 does not extend along this section of the deck bed 262. The roller track 266 may be fixed to the deck beam 264 or may extend down from the deck bed 262. The roller track 266 is positioned lower than the surface of the deck bed 262 and does not extend out as far as the rub rail 263 so as not to conflict with the travel of the outboard brace 210 when the structural ribbing is rotated to the stowed position.

Depending on the specific embodiment, there may or may not be a limit to the outboard rotation of the axle 290. Though quite feasible to rotate the outboard braces 210 such that they are completely parallel to the deck bed 262, the benefit to further rotation begins to diminish after a certain load length capability is reached. In the illustrated embodiment, rotation may be limited by contact to the outer rub rail 263, the desire not to pull inboard brace wheel 232 off of the roller track 266, or simply by the travel allowance of the gearing that drives the axle 290. However, even with these limitations, a cargo load having a length of 52 feet can be placed on the deck bed 262 as illustrated in FIG. 20. Thus, the design changes needed to further extend the ribbing structure, such as more travel in the axle gearing, removal of the outside rub rail 263 and an extension on the roller track 266, are not generally desirable given that only an additional foot of load length capacity could result before the ends of a standard trailer chassis would be reached.

This increased load clearance of platform 200 over platform 100 is partially enabled because of the outboard positioning of axle 290. Instead of placement directly under the Forty Foot Points, the axle 290 is moved outboard, thus positioning the outboard braces 210 further outboard than the support posts 110 of FIG. 3. Though this results in the structural ribbing being at a non-perpendicular angle in the lift position, any weakness caused is more than offset by the A-frame structure and resulting support provided by the inboard braces 230. Another advantage provided in this embodiment is that it can accommodate taller loads out to and beyond the Forty Foot Points. As the axle rotates, the connector beams not only move inboard and outboard, they also move up and down. In the embodiment shown in FIG. 3, the structural ribbing is perpendicular to the deck bed 162 at the Forty Foot Points the highest point it will reach. Thus, any outboard movement from the lift position will cause the connector beams 120 to lower. However, because the structural ribbing of the transport platform 200 is not yet perpendicular when in the lift position, the connector beam 220 will actually rise up higher initially as the axle 290 is rotated to the extended load position. The result is that the platform 200 provides usable cargo space up to and outboard of the lift position height of the connector beam that platform 100 does not provide.

Figure 21:
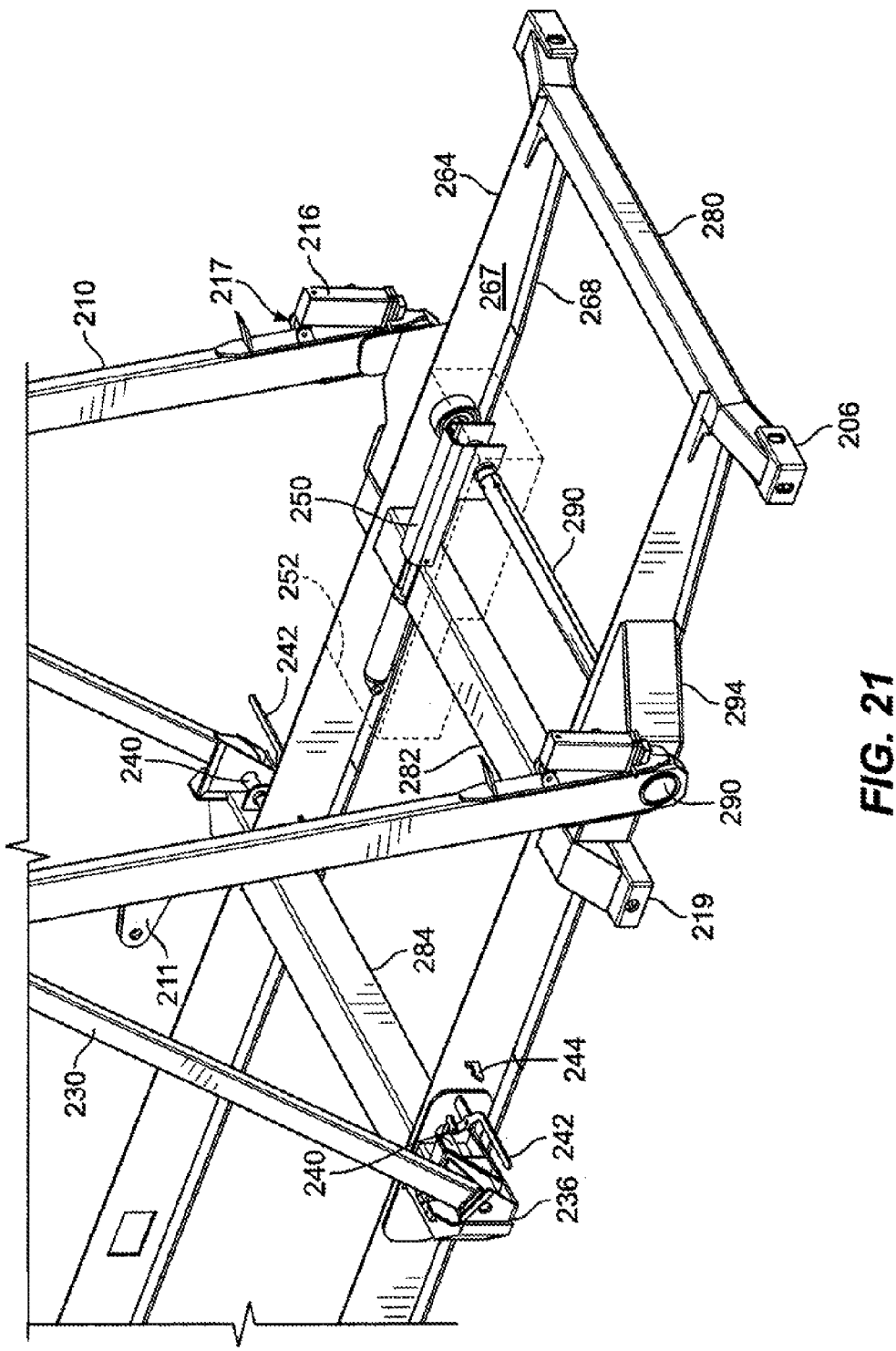
FIG. 21 is a close-up perspective view of the same corner as that shown in FIG. 18, but with the deck bed removed to reveal underlying components.

FIG. 21 provides a view of transport platform 200 similar to that of FIG. 18, but the deck bed 262 has been removed in FIG. 21 to reveal a portion of the underlying frame. The frame is comprised of a series of crossmembers and the axle 290 in combination with the deck beams 264. Noticeably absent from the deck beams 264 is an upper flange. An upper flange is not required to fit up to the unitary deck bed 262. However, upper flanges may still be used in certain embodiments to mate to deck bed 262 to provide additional strength to the connection between the frame and the deck bed. The space between the crossmembers provides for considerable storage space under the deck bed 262 for miscellaneous materials such as tools, tie down straps, canvases, the control unit for converting the transport platform between positions, or other material. Though not shown, a storage compartment can be bolted or otherwise fixed to the frame or underside of the deck bed that can be accessed from underneath the transport platform, of from access panels such as access panel 169 discussed in association with FIG. 5 above.

Figure 21A:
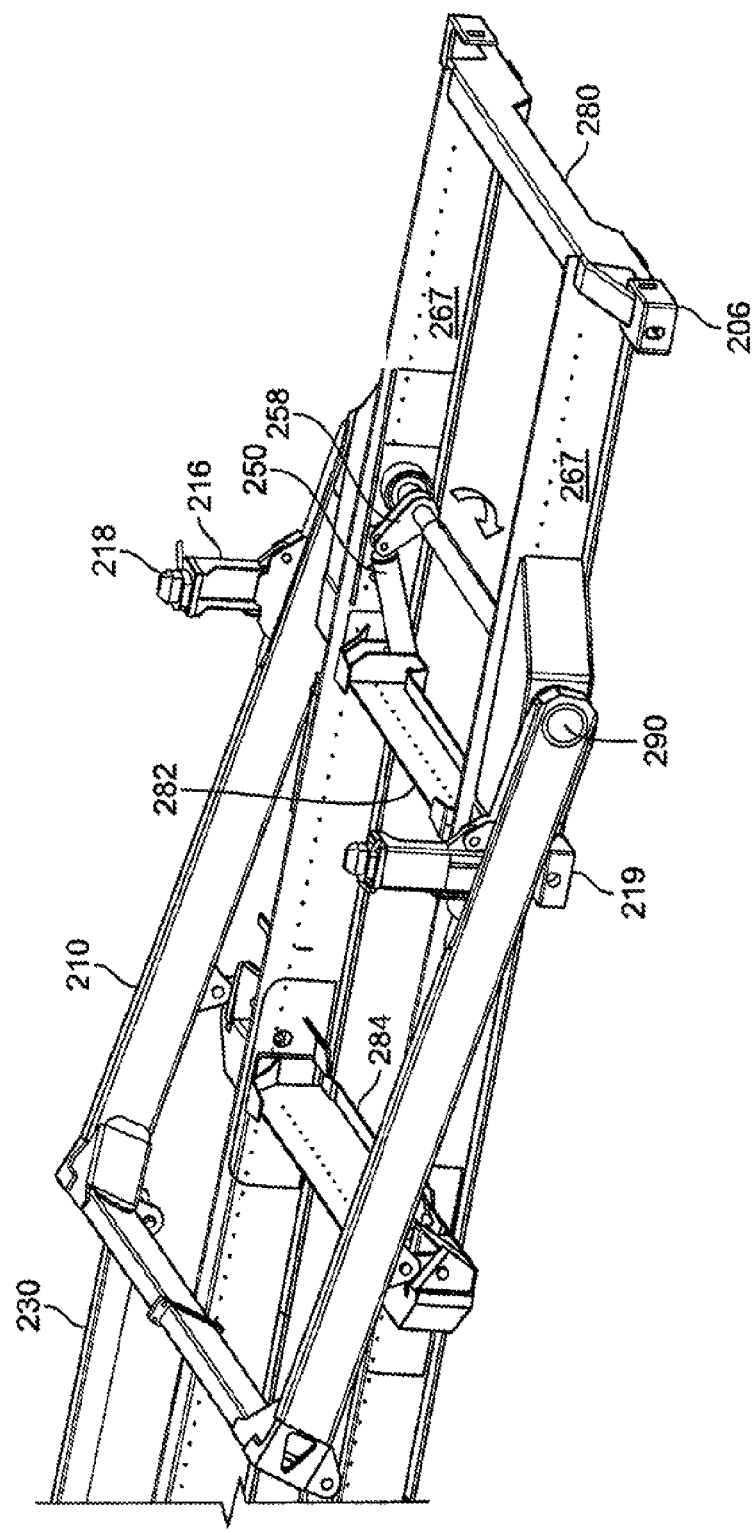
FIG. 21A is the same view as that of FIG. 21, but with alternate components in place, and showing the platform in the stowed configuration.

Instead of using the upper and lower flanges to fix multiple crossmembers in place, the few crossmembers of platform 200 shown in the illustrated embodiment extend through the webbing 267 of the deck beams 264. The crossmembers in this view include end crossmember 280, forty foot crossmember 282, and locking point crossmember 284. Axle 290, which may or may not be disposed within an axle housing 292, provides an additional connection between the two deck beams 264. These three crossmembers and the axle are mirrored on the other side of the platform frame. As shown in FIG. 21, the crossmembers are hollow steel tubes or columns of reasonably thin gauge. FIG. 21A shows a forty foot crossmember 282 and a locking point crossmember 284 in alternative embodiments where they take on the T-beam structure of the deck beams 264, having only a webbing and a lower flange. This crossmember design may require thicker gauge steel, but less of it overall.

Figure 25:
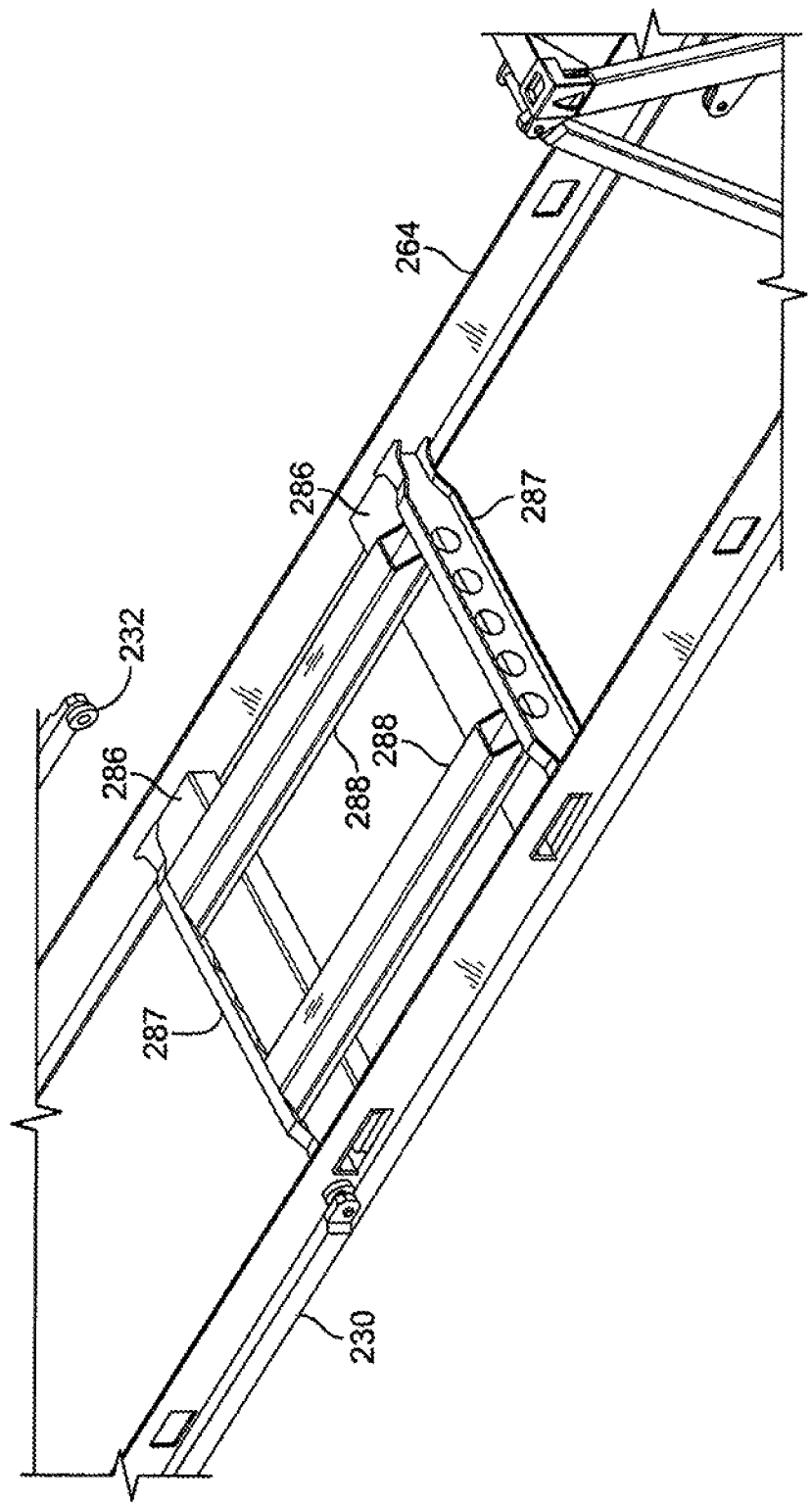
FIG. 25 is perspective view of the center section of the transport platform shown in FIG. 17, with the deck bed removed to highlight certain components.

In addition, as shown in FIG. 25, there are two interior crossmembers referred to herein as fork lift crossmembers 286. Other crossmembers may be added in some embodiments to support heavier loads, while some crossmembers may be removed in still other embodiments intended for transporting lighter loads via lower capacity railcar or trailer chassis. High strength steel may be used where desired to reduce weight, and the gauges may vary among the crossmembers based on loading parameters. For instance, the forty foot crossmembers 282 and end crossmembers 280 may take more of a load because they position and support the stacking block receivers 219 and the corner fitments 206, respectively.

Figure 22:
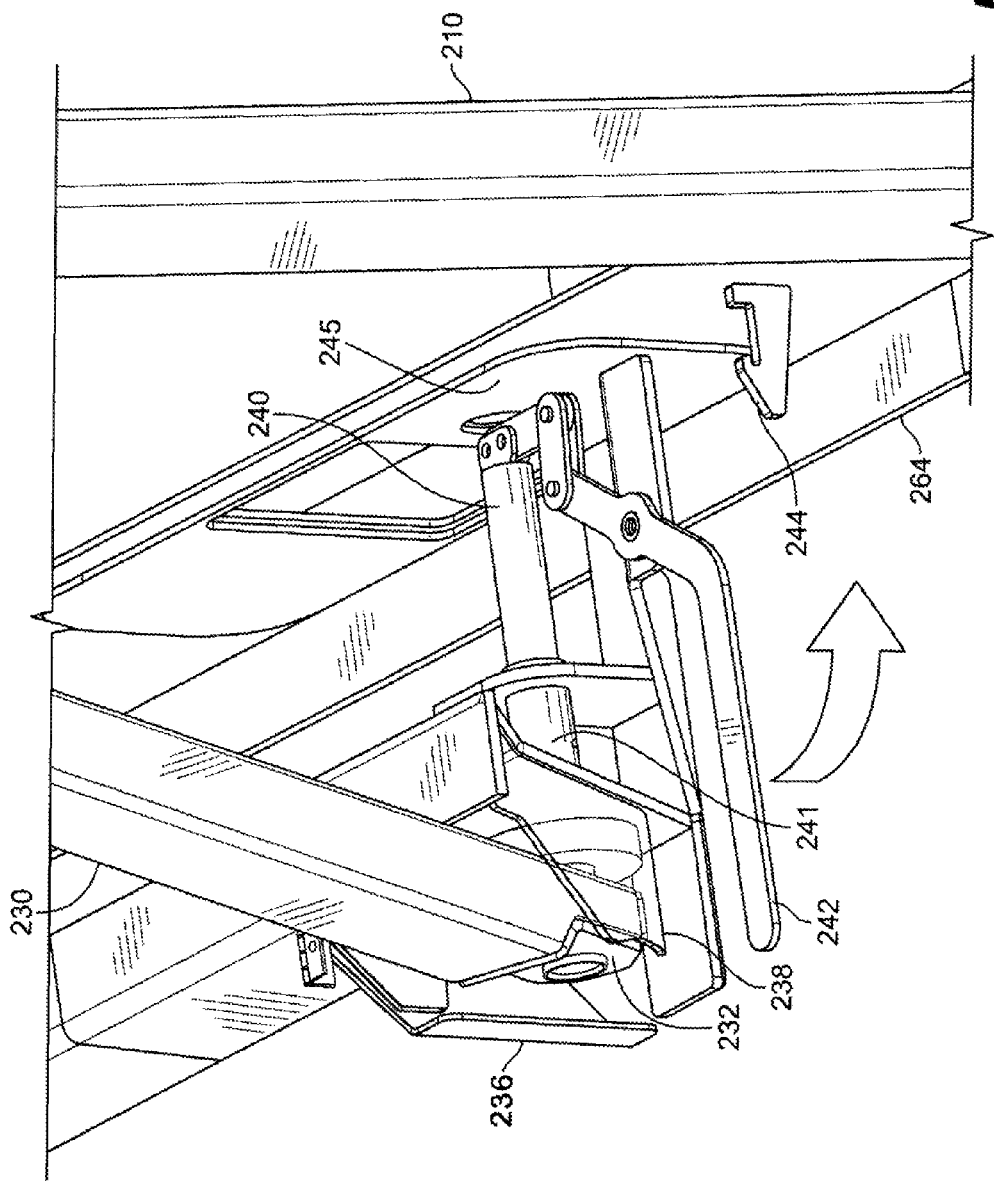
FIGS. 22 and 22A are perspective views at a particular area of the transport platform shown in FIG. 17 with certain components removed to display the locking pin configuration in the unlocked and locked positions, respectively.

Also shown in the cutaway view of FIG. 21 is more of the locking mechanism which retains the inboard brace wheels 232 in the lift position or the stowage lock brackets 211 in the stowed position. Even further detail is provided of this mechanism in FIGS. 22 and 22*a*. FIG. 22 shows the locking pin 240 in the retracted, or unlocked, position. Note that the pin 240 is still not fully retracted from its housing in this position. In order to see this clearly, the deck bed 262, the roller track 266, and the locking point crossmember 284 have been removed. Notably, when these elements are in place, they provide additional protection to the locking mechanism to prevent it from getting damaged or coming unfastened during transit. In the unlocked position shown, the locking pin release handle 242 is pointed outward from the deck beam 264. In this position, the connection assembly of the handle 242 to the locking pin 240 pulls the pin back out of the locking pin housing 241. The housing 241 keeps the pin 240 in alignment and prevents it from getting damaged or corroded. Though the end of the pin 240 is not shown, it is pulled back in this position such that it is free of the center hole of inboard brace wheel 232. Were the axle 290 to rotate, the brace wheel 232 would begin its ascent up either ramp 265 (not shown) to move into the stowed position, or back support 238 to move into the extended load position.

Figure 22A:
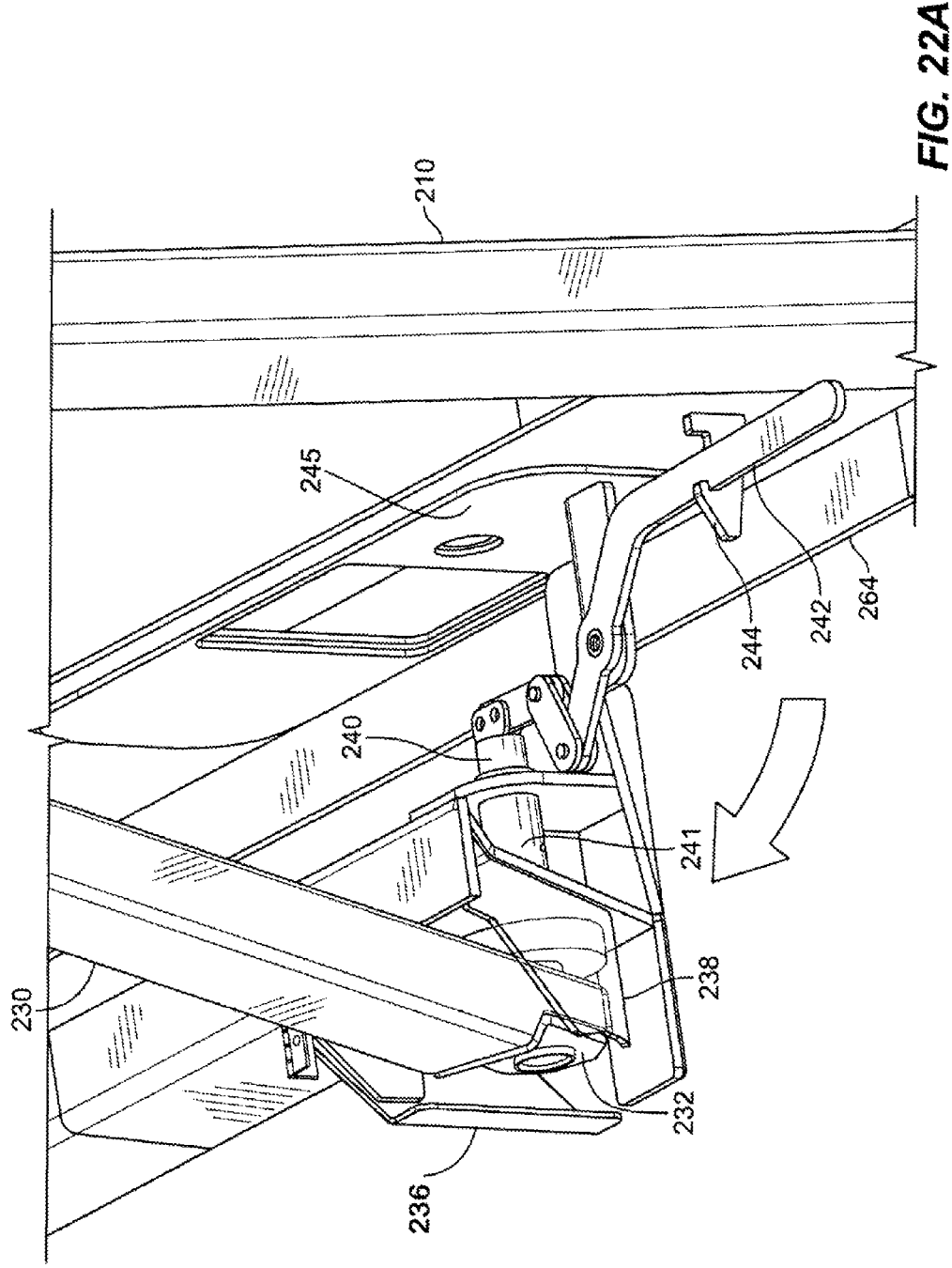
Figure 23:
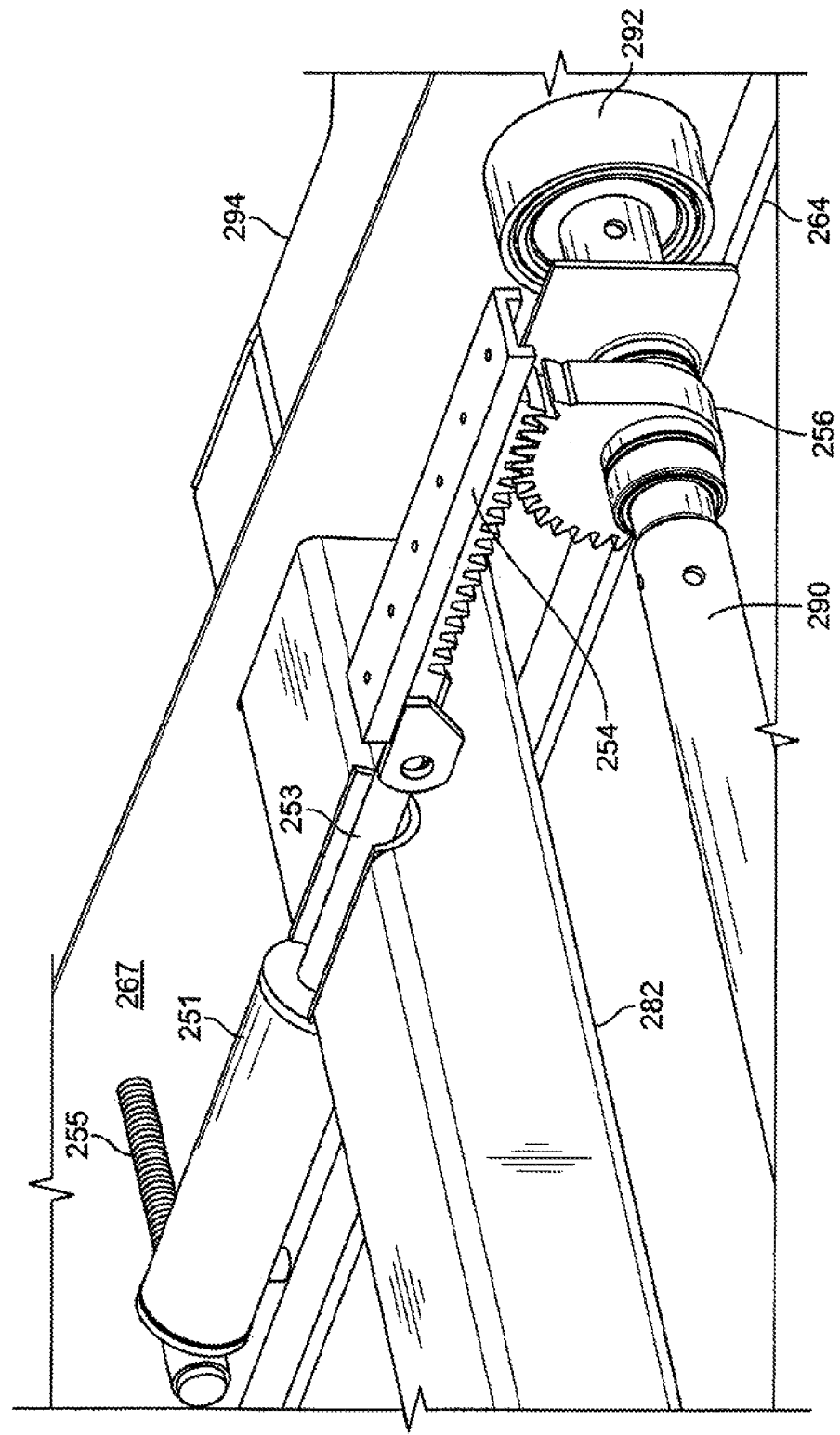
FIG. 23 is a close-up perspective view of a motor assembly of the transport platform shown in FIG. 17, with certain components removed to reveal other underlying components.

To insert the locking pin 240 into the inboard brace wheel 232 (or into the stowage lock bracket 211, as the case may be) and lock the structural ribbing into position, the locking pin release handle 242 is rotated backward such that it is parallel with the deck beam 264. This position is shown in FIG. 22*a*. As the handle 242 is rotated, the locking pin 240 extends through and is guided by lock pin housing 241 and into place. A retention member 244 is affixed to the webbing 267 of the deck beam 264 to lock the handle 242 in place. Other locking means, such as a padlock or chain, may be used for additional security if desired. Thus, the locking mechanism of the illustrated embodiment provides an important safety and durability advantage over prior art designs that require manual removal and replacement of pins and difficult alignment of hard components. The pin 240 itself can be chamfered in a manner similar to that of longitudinal brace lock pin 132 of FIG. 10. But here, leverage is provided through the use of handle 242, and alignment is provided through the use of lock pin housing 241 and the receptacle provided by brace bracket 236. More importantly, because of the movement and configuration of the braces 210 and 230, the pin 240 never actually has to be completely removed from its housing 241 to move the transport platform from the stowed position to the lift position. Rather, an operator simply rotates the four locking pin release handles 242 outward, rotates the axles 290 as necessary using a control unit, and then rotates the handles 242 back into place, securing them into the retention members 244.

The entire locking mechanism, and the brace bracket 236 which supports it, is fixed to and extends from the outer surface of deck beam 264. A locking mechanism reinforcement plate 245 may be provided for additional stiffness in some embodiments. As shown, the reinforcement plate 245 and the deck beam 264 both have a large cutout through which extends the locking point crossmember 284. The crossmember 284 may be used to provide additional structure and support for the locking mechanism and associated brace bracket 236.

Returning to FIG. 21, another feature shown through the removal of the deck bed 262 is the powering mechanism of the illustrated embodiment, motor assembly 250. As discussed in the background section, prior art collapsible designs were crudely designed and utilized springs and levers to manually collapse and raise support members into position. The present invention has been specifically adapted to use more refined, yet powerful and effective, means of deployment. As shown and explained in association with FIG. 5, the transport platform 100 uses HCUs 156 and rams 150 to move the support members 110 back and forth about the axle 190. While effective, this requires routing of pressurized hydraulic lines outside the protected undercarriage area. Alternatively, transport platform 200 harnesses a motor assembly 250 to directly drive the axle 290, thus turning the outer braces 210.

Though not shown or explained in detail to avoid repetition, the control aspects of the motor assembly 250 are much the same as that discussed in association with FIG. 5 above. Namely, a control unit is connected to a wiring harness leading from the motor assembly 250 through a receptacle or exit point of the frame. The control unit is then connected to a power source, such as a truck or forklift battery. The control unit comprises a power converter to step up or down the voltage, and the battery is used to power the motor assembly 250 as directed by the control unit. Thus, the transport platform 200 may be converted between its various configurations remotely without an operator standing directly next to or on the transport platform.

As shown in FIG. 21, the motor assembly 250 operates to directly rotate the axle 290, which extends to the outboard braces 110 by passing through the deck beams 264 and through the axle spacer assemblies 294 used to laterally position the outboard braces 110. The specific motor type and configuration can vary, however it should be geared to provide slow and controlled, yet powerful travel in order to safely and effectively rotate the axle 290. In the illustrated embodiment, the motor must turn the axle 290 approximately 110 degrees across the full length of travel of the rack 254 over the pinion gear 256, and should be able to produce approximately 60,000 in-lbs of torque. To overcome gravity, a higher level of torque is required to raise the components of the structural ribbing into position than is necessary to lower them down.

In the illustrated embodiment of FIG. 21, the rack 254 is in the fully retracted position, which would indicate that the outboard braces 210 are rotated down into the stowed position. As the ram 253 extends from the ram housing 251, rack 254 will extend outward to rotate pinion gear 256, rotating the axle 290 and raising the outboard braces 210, the inboard braces 230 and the connector beam 220. To lower the members back down, the ram 253 will reverse direction. The proximity of the forty foot crossmember 282 can be utilized to provide a connection point to help hold the motor assembly 250 in place relative to the axle 290 as the motor operates. The motor assembly also may be positioned next to one or the other of the deck beams 264 and affixed thereto for additional longitudinal stability. Also, as shown in hidden lines in FIG. 21, the motor assembly 250 may be disposed within a motor housing 252 which can be fixed between the bottom of the deck bed 262 and the forty foot crossmember 282. The motor housing 252 may provide an access panel (not shown) on its underside to allow for service or replacement of the motor assembly 250. In other embodiments, the motor assembly 250 may be packaged on the outside of the deck beam to facilitate easier service and connection to the remote control unit.

FIG. 21A illustrates another motor alternative and configuration. Here, the motor assembly 250 takes the form of a small hydraulic cylinder. Unlike the hydraulic system of FIG. 5, the hydraulics here are completely contained within the cylinder. As the motor powers an internal hydraulic circuit the cylinder expands pressing on the axle cam bracket 258 to rotate the axle 290 as shown by the arrow. Based on packaging and ground clearance constraints, it may be necessary to provide a cutout in the deck bed 262 to permit full travel of the axle cam bracket 258. Again, the forty foot crossmember 282 is used as leverage for the motor assembly 250 to expand against. It will be understood that a number of other varieties of motor types and configurations could be used to drive the axle, with the constraints being packaging, weight, and power requirements. Though the illustrated embodiments features a single motor assembly 250 per axle, multiple smaller motors could be used. Unlike with hydraulics, where independent side operation may require a separate hydraulic circuit, the motor configuration used with platform 200 allows for completely independent operation of the structural ribbings on each side of the platform.

FIG. 24 provides a full length bottom view of the collapsible intermodal transport platform 200, with the deck bed 262 removed. On the right side, the structural ribbing is rotated into the stowed position, while on the left side, it is in the lift position. Note that the connector beam 220 is fully occluded on the right hand side, because it is directly above the forty foot axle 282, as it must be to locate the lifting fitments 212 at the proper Forty Foot Points. Though the majority of the illustrated components have already been disclosed, this view serves to demonstrate how the frame is structured, and how it fits up to a standard trailer chassis. Not counting the axle 290, there are four crossmembers per side, and only eight across the entire 53-foot length of the frame in the illustrated embodiment. The only crossmembers that have not been previously illustrated are the fork lift crossmembers 286, which are shown in a perspective view from the top (also with the deck bed 262 removed) in FIG. 25.

The forklift crossmembers 286 are hollow, and shaped to accept the tines of a standard forklift. Two load distributors 288 are positioned across the forklift crossmembers 286 to form a rigid box that helps distribute the moment loads which can result from lifting a heavily loaded transport platform. Further structural support is also provided by the fork lift crossmember supports 287, although as shown, these have been trimmed for additional weight savings. Both the load distributors 288 and the fork lift crossmember supports 287 are optional, and may be removed to save additional weight in some embodiments where lower weight cargo is anticipated. Aside from being fairly distributed across the length of the platform 200, each crossmember of the platform is strategically placed for a specific purpose. The end crossmembers 280 locate and support the corner fitments 206 for loading on a trailer chassis. The forty foot crossmembers 282 help package and support the motor assembly 250, but also locate and support the stacking block receivers 219. The locking point crossmembers 284 locate and support the brace brackets 236 which fix the structural ribbing into position. Finally, the forklift crossmembers 286 provide rigid forklift points, but also help balance the load across the trailer chassis rails 44 (see FIG. 15).

While the standard gap between the trailer chassis rails is thirty-nine inches, the deck beams 264 of the illustrated design shown in FIG. 24 are approximately sixty-six inches apart. Thus, the deck beams 264 rest outside of the trailer chassis rails 44 when loaded on a standard trailer chassis 40. In addition, this greater width provides more strength to the outer portion of the deck bed 262 for securing cargo and helps prevents the transport platform from bowing when being lifted with full cargo loads. Though the corner fitments 206 are the principal contact points, the crossmembers may also provide support as they rest on or contact the chassis rails 44 during the vertical jounce and rebound the trailer will experience during transit. Finally, the distance between the braces 210 and 230 from side to side is evident. This configuration allows for cargo loads out to ninety-six inches in width.

Having removed the deck bed 262 from several of the previous views, it is shown in isolation in FIG. 26. In this view, the underside of the deck bed 262 is exposed, and the arched shape is clearly defined. This shape conforms to the arched webbing 267 of the deck beams 264, which provides significant additional load capacity, strength and stiffness to the transport platform, as explained in association with FIG. 6 above. Though not present in all embodiments, and distributed differently in others, the rub rail 263 is shown in a configuration where the grooves are exposed which can be used to retain sliding wenches 202 (not shown). The view also shows the roller tracks 266 for retaining the inboard brace wheels 232 as the structural ribbing is rotated back to the extended load position. These tracks may be a component of the deck bed 262, or may be affixed to the deck beams 264. Apparent for the first time in this view are two deck bed mounting rails 260, which run the length of the deck bed 262. The mounting rails 260 are used to mount the deck bed 262 to the deck beams 264, and thus to the remainder of the intermodal frame.

Figure 26A:
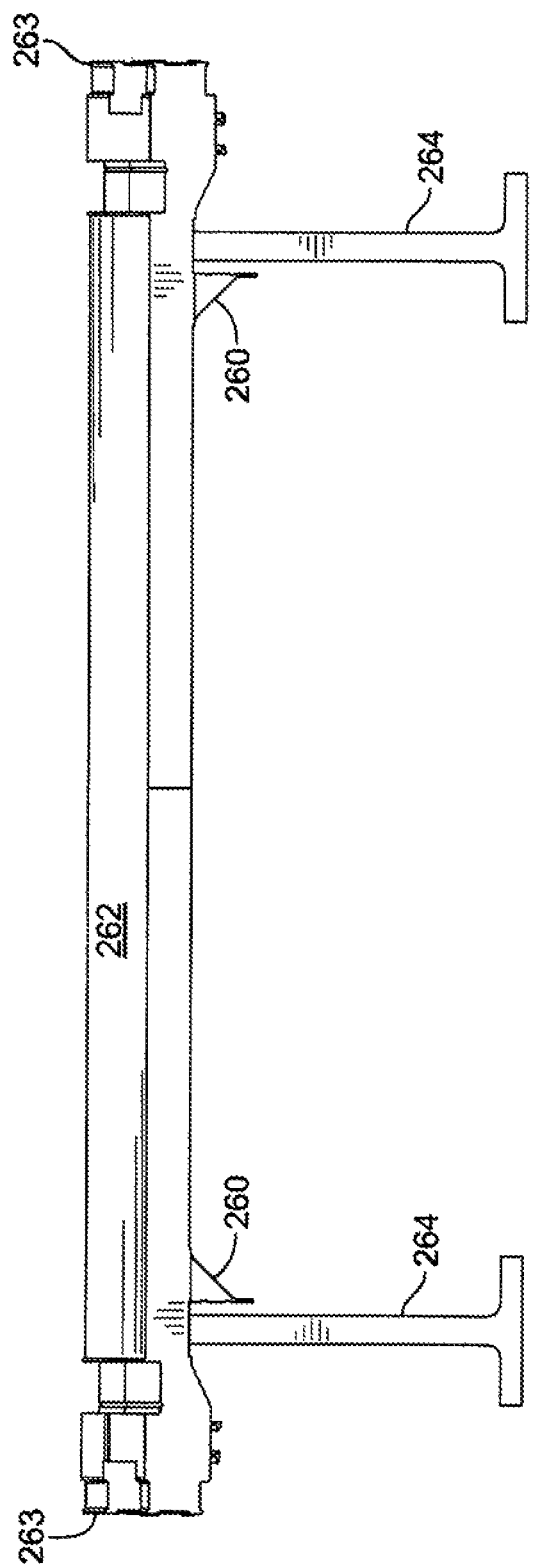
FIG. 26A is an end view of the deck bed of FIG. 26 showing the deck beams attached.

The mounting of the frame to the deck bed 262 is partially illustrated in FIG. 26a. This procedure must be done properly to prevent galvanic corrosion from resulting due to the contact of dissimilar metals such as the aluminum in the deck bed 262 and the steel of the deck beams 264. While not necessary if wood or steel deck beds are substituted, here a special adhesive is used to separate the deck bed mounting rail 260 from its respective deck beam 264. After the adhesive is applied, the webbing 267 of the deck beams 264 is bolted to the downstanding surface provided by the deck bed mounting rails 260. The mounting rails, which are aluminum themselves, are in turn welded to the bottom surface of the deck bed 262. Though the deck beams 264 appear to contact the aluminum underside of the deck bed 262 directly, they actually affix only to the deck bed mounting rails 260 in preferred embodiments. Also, the deck beams 264 are illustrated as being wider than they actually are in relation to the deck bed 262, which is approximately four inches thick in the illustrated embodiment.

FIG. 27 provides a hypothetical overlay, using side views of the collapsible intermodal transport platform 200, an overhead crane 70, a standard trailer chassis 40, and a railroad well car 60 to show how the platform 200 vertically aligns with the devices used to lift, load or haul it. The dotted lines through the Forty Foot Points "A" show how these points are aligned with the lifting hooks on a standard overhead crane 70, as well as the primary crossmembers 62 of a standard railroad well car 60. The dotted line also shows how the lifting fitments 212 are positioned directly over the stacking block receivers 219 on the platform 200. Finally, though no line is provided, it is clearly evident how corner fitments 206 of the platform 200 are directly over the adjoining (albeit oversized, as illustrated) corner fitments 42 of the 53-foot trailer chassis 40. Were the platform 200 to be placed, instead, into the well 61 of the railroad well car 60, it would fit between the sides of the well, which are shown as greater than fifty-three feet apart.

The present invention addresses shortcoming in prior art attempts to deliver a serviceable, efficient and durable flatbed suitable for intermodal transport operations. The disclosed designs and methods for operation provide a solution for logistics companies to transport full length loads on a lightweight platform that can be lifted and stacked when fully loaded or empty. When empty, the platform may be collapsed substantially flat so as to allow several platforms to be stacked and transported on a single chassis or stored in a limited space. Controlled hydraulic or electric power prevents damage to components and enables smooth, safe conversion between stowed, lift and extended load positions by a single human operator. Various safety pins and retention features are provided to ensure a robust design.

Accordingly, it should now be clear how the intermodal collapsible transport platforms 100 and 200 can be used to facilitate intermodal load transport in a convenient, efficient manner. Any process descriptions or blocks in the figures, such as FIGS. 13-14, should be understood as representing a logical sequence of steps in a process, and alternate implementations are included within the scope of the embodiments of the present invention in which functions may be executed out of order from that shown or discussed, as would be understood by those having ordinary skill in the art.

It should be emphasized that the above-described exemplary embodiments of the present invention, and particularly any "preferred" embodiments, are possible examples of implementations, merely set forth for a clear understanding of the principles of the invention. Many other variations and modifications may be made to the above-described embodiments of the invention without substantially departing from the spirit and principles of the invention. All such modifications are intended to be included herein within the scope of this disclosure and the present invention and protected by the following claims.

The invention claimed is:

1. A transport platform comprising:
   a loading surface having two ends and two sides and a centerline equidistant between the two ends;
   a frame disposed beneath the loading surface;
   two first braces on each of the two sides of the loading surface, each first brace having a first end attached to the frame at a first distance from the centerline of the loading surface, and a second end extending from and rotatable about the first end; and
   two second braces on each of the two sides of the loading surface, each second brace having a proximal end attached to the second end of one of the first braces, and a distal end extending from the proximal end; and
   a wheel attached to each second brace near the distal end of the second brace;
   wherein, when the transport platform is placed in a stowed position, the second end of each first brace is proximate to the loading surface and extends toward the centerline of the loading surface;
   and wherein, when the transport platform is placed in a lift position, the second end of each first brace extends away from the loading surface.

2. The transport platform of claim 1, wherein each wheel is configured to support at least a portion of weight of the second brace to which the wheel is attached as the transport platform is converted from the lift position to the stowed position.

3. The transport platform of claim 1, further comprising a rub rail attached to each side of the loading surface.

4. The transport platform of claim 3, wherein each rub rail provides shelf on which the wheels can roll.

5. The transport platform of claim 4, wherein the wheels roll along the shelf as the transport platform is converted between the stowed position and the lift position.

6. A transport platform comprising:
   a loading surface having two ends and two sides and a centerline equidistant between the two ends;
   a frame disposed beneath the loading surface;
   two first braces on each of the two sides of the loading surface, each first brace having a first end attached to the frame, and a second end extending from and rotatable about the first end;
   two second braces on each of the two sides of the loading surface, each second brace having a proximal end attached to the second end of one of the first braces, and a distal end extending from the proximal end;
   wherein at least one of the second braces comprises a rotatable wheel near its distal end.

7. The transport platform of claim 6, further comprising a rub rail attached to each side of the loading surface.

8. The transport platform of claim 7, wherein the rub rail provides a shelf on which the wheel can roll.

9. The transport platform of claim 6, wherein the wheel is configured to support at least a component of weight of the second brace.

10. The transport platform of claim 6, wherein the wheel is configured to roll along the loading surface to reposition the second brace.

11. The transport platform of claim 6, wherein the wheel is configured to roll along a length of the frame to reposition the second brace.

12. The transport platform of claim 6, wherein the wheel is configured to transfer the distal end of the second brace closer to or further from the first end of the first brace to which the second brace is attached.

* * * * *